(12) United States Patent
Gallagher

(10) Patent No.: US 10,200,934 B2
(45) Date of Patent: Feb. 5, 2019

(54) DATA TRAFFIC REDUCTION FOR SUSPENDED DATA SERVICE

(71) Applicant: Cisco Technology, Inc., San Jose, CA (US)

(72) Inventor: Michael Douglas Gallagher, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/600,817

(22) Filed: May 22, 2017

(65) Prior Publication Data

US 2018/0338274 A1 Nov. 22, 2018

(51) Int. Cl.
*H04W 48/02* (2009.01)
*H04W 28/02* (2009.01)
*H04W 88/06* (2009.01)

(52) U.S. Cl.
CPC ....... *H04W 48/02* (2013.01); *H04W 28/0247* (2013.01); *H04W 88/06* (2013.01)

(58) Field of Classification Search
CPC .. H04W 48/02; H04W 28/0247; H04W 88/06
USPC ........................................................ 455/445
See application file for complete search history.

(56) References Cited

U.S. PATENT DOCUMENTS

| | | |
|---|---|---|
| 6,885,859 B2 | 4/2005 | Karaoguz et al. |
| 9,479,595 B2 | 10/2016 | Canpolat et al. |
| 2012/0236733 A1 | 9/2012 | Deu-Ngoc et al. |
| 2013/0052989 A1* | 2/2013 | Mahalingam ......... H04W 12/06 455/411 |
| 2014/0195654 A1 | 7/2014 | Kiukkonen et al. |
| 2015/0215974 A1 | 7/2015 | Cloutier |
| 2015/0341830 A1 | 11/2015 | Jeong |
| 2016/0127850 A1 | 5/2016 | Kao |
| 2016/0234124 A1 | 8/2016 | Tomici et al. |
| 2016/0249248 A1* | 8/2016 | Ronneke ........... H04W 28/0284 |
| 2016/0269467 A1 | 9/2016 | Lee et al. |
| 2016/0353495 A1 | 12/2016 | Smadi et al. |
| 2017/0064581 A1* | 3/2017 | Jeong .................... H04W 48/14 |
| 2017/0311249 A1* | 10/2017 | Lopes .................. H04W 48/20 |

FOREIGN PATENT DOCUMENTS

WO 2015163743 A1 10/2015

* cited by examiner

*Primary Examiner* — Timothy Pham
(74) *Attorney, Agent, or Firm* — Fernando & Partners, LLP

(57) ABSTRACT

In one example, a mobile AP device receives from a mobile device a request to a server or device in an IP network. When cellular data service of the mobile AP device is available, the mobile AP device allows the request to be sent to a mobile network for communication to the server or device. When the cellular data service is suspended, the mobile AP device disallows the request from being sent to the mobile network to prohibit the communication to the server or device. For a request for content, the mobile AP device may additionally generate and send to the mobile device a response indicating a redirect to a local landing page of the mobile AP device. A control center or server may send one or more messages which instruct the mobile AP device to process the requests in accordance with one or more rules to disallow the requests.

20 Claims, 10 Drawing Sheets

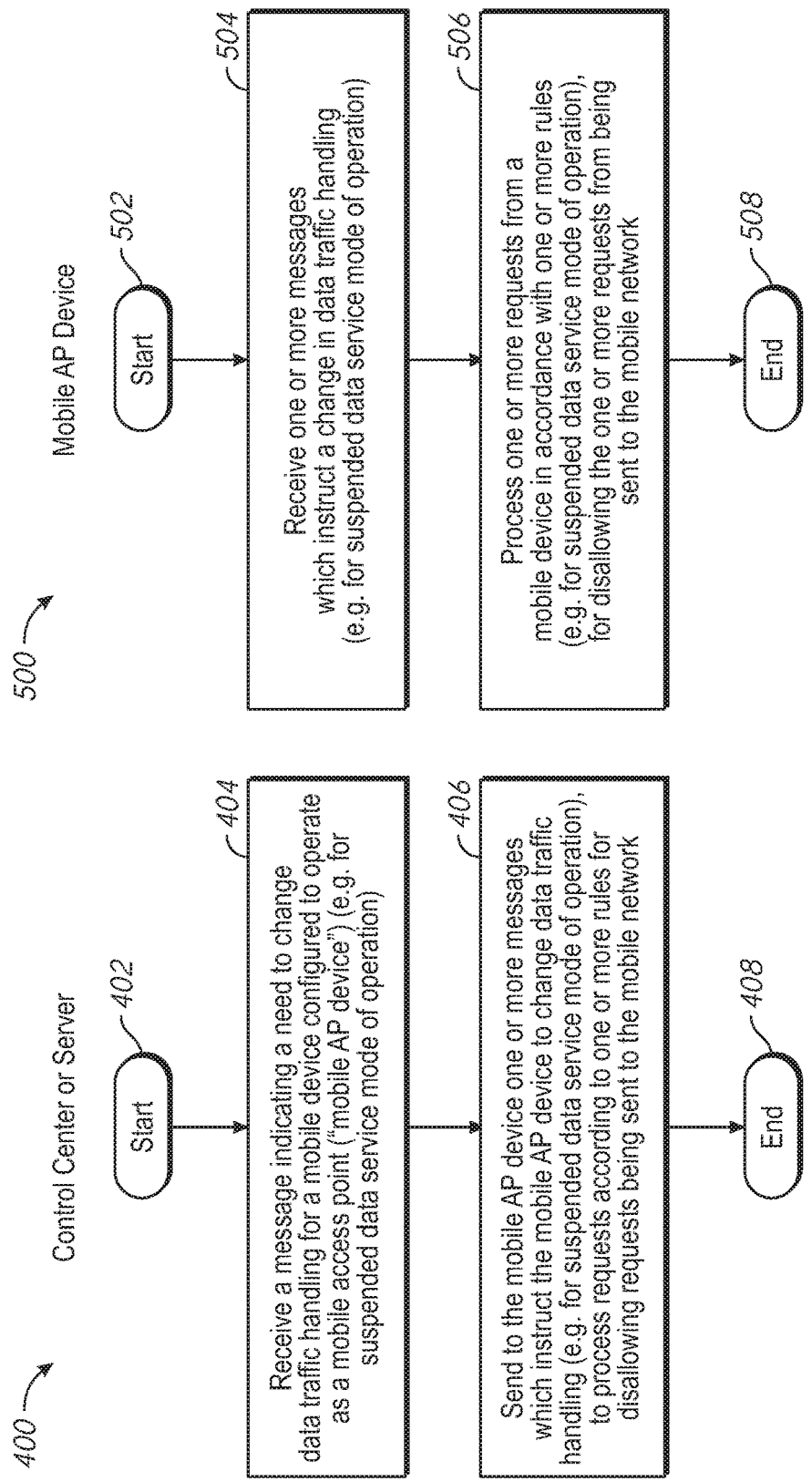

DATA TRAFFIC REDUCTION FOR SUSPENDED DATA SERVICE

TECHNICAL FIELD

The present disclosure generally relates to reducing data traffic in communication systems, in networks, and for devices, and in particular, to reducing data traffic associated with mobile access point (AP) devices during data service suspension.

BACKGROUND

A communication system may include a mobile communication network, such as a cellular telecommunications network, connected to an IP communication network, such as the Internet. The communication system may provide mobile communication devices, such as cellular telephones and smartphones, with voice and data communication services. Wireless local area networks (WLANs) may also provide wireless connections to the IP network for these mobile devices, as devices are often additionally configured for communications in accordance with IEEE 802.11. Internet of Things (IoT) devices are becoming more commonplace in these types of environments.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 4 is a flowchart for describing a method of controlling data traffic by a control center or server of a communication system, which may be used for reducing data traffic when data service for a mobile AP device is suspended;

FIG. 5 is a flowchart for describing a method of controlling data traffic by a mobile AP device of a communication system, which may be used for reducing data traffic when data service for a mobile AP device is suspended;

Figure 1:
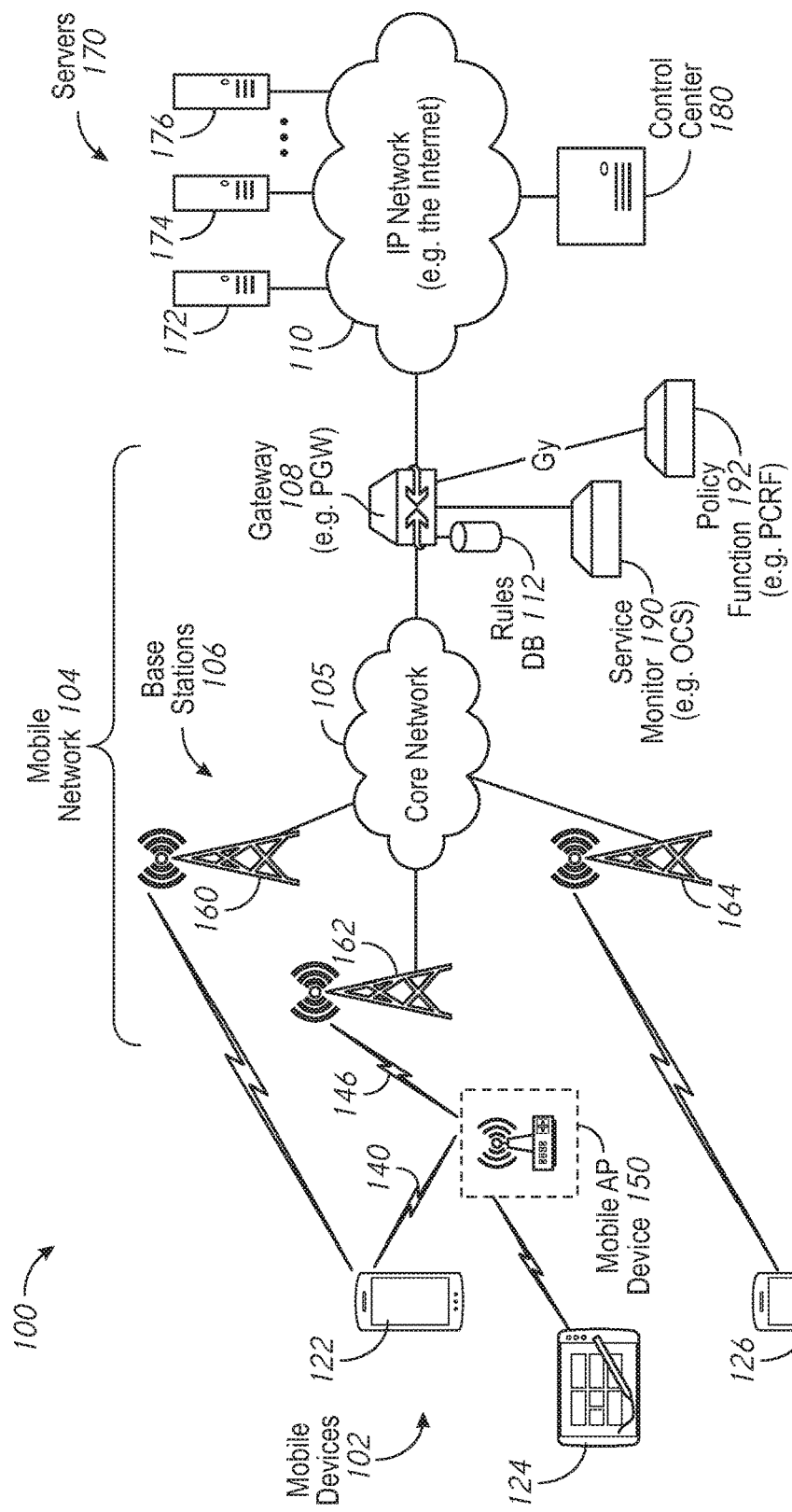
FIG. 1 is a diagram of a communication system which illustrates one type of environment within which techniques of the present disclosure may be employed, the communication system including a mobile access point (AP) device configured to facilitate communication of data traffic between mobile communication devices and servers or devices of an IP communication network.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

A mobile device may operate for communications in a cellular network, a wireless local area network (WLAN), or other suitable network. A mobile device may even be equipped with dual communication capabilities (e.g. both cellular and Wi-Fi), and configured to operate as a mobile access point (AP) to provide a mobile "hotspot" for communication devices. For example, a "connected car" environment provides a mobile AP function to provide a mobile hotspot in a vehicle, so that communication devices may access voice and/or data communication services and the Internet.

There is an ongoing need for advancing and improving devices, networks, and communications in the above-described environments, as well as advancing and improving devices, networks, and communications associated with other similar or even unrelated environments.

As described herein, a mobile communication device may be configured to operate as a mobile access point (AP) and be referred to as a "mobile AP device" or the like. In one illustrative example, the mobile AP device receives from a mobile device one or more requests to a server or device in an IP network. When data service is available, the mobile AP device allows the one or more requests to be sent to a mobile network for communication to the server or device in the IP network. When the data service is suspended, the mobile AP device disallows the one or more requests from being sent to the mobile network to prohibit the communication to the server or device in the IP network. The data service may be part of a cellular communication service provided by a service provider, where the cellular service is made available or suspended by the service provider.

The specific handling of a request may vary depending on one or more parameters of the request, such as the type of request. For a request for content (e.g. an HTTP GET request), for example, the mobile AP device may additionally generate and send to the mobile device a response indicating a redirect to a local landing page of the mobile AP device.

Prior to such processing, the mobile AP device may receive via the mobile network one or more messages which instruct a change in data traffic handling. In particular, the one or more messages may instruct the mobile AP device to process the one or more requests in accordance with one or more rules for a suspended data service mode of operation. The one or more rules include a rule for disallowing the one or more requests from being sent to the mobile network during the suspended data service mode.

In some implementations, the one or more messages may enable or activate one or more rules previously stored in memory of the mobile AP device. In addition, or alternatively, the one or more rules for processing the one or more requests may be received by the mobile AP device in the one or more messages and stored in memory of the mobile AP device.

Also as disclosed herein, a control center or server may receive a message indicating a need to change data traffic handling for a mobile AP device based on one or more suspension conditions being identified. In response, the control center or server may send to the mobile AP device one or more messages which instruct a change in data traffic handling for the mobile AP device. In particular, the one or more messages may instruct the mobile AP device to process the one or more requests in accordance with one or more rules for a suspended data service mode of operation. The one or more rules include a rule for disallowing the one or more requests from being sent to the mobile network in the suspended data service mode.

In some implementations, the one or more messages may enable or activate one or more rules previously stored in memory of the mobile AP device. In addition, or alternatively, the one or more rules for processing the one or more requests may be sent in the one or more messages for storage in memory of the mobile AP device.

EXAMPLE EMBODIMENTS

Referring now to FIG. 1, a diagram of a communication system 100 illustrating one type of environment within which techniques of the present disclosure may be employed is shown. While pertinent features are illustrated in FIG. 1 and the other Figures, those of ordinary skill in the art will appreciate from the present disclosure that various other features have not been illustrated for the sake of brevity and so as not to obscure more pertinent aspects of the example implementations disclosed herein.

Communication system 100 of FIG. 1 may generally include a mobile communication network ("mobile network") 104 connected to an IP communication network 110 ("IP network").

Mobile network 104 may be a wireless wide area network (WWAN), such as a cellular telecommunications network. Mobile network 104 may include a plurality of base stations 106, such as base stations 160, 162, and 164, connected to a core network 105. A gateway 108 may be used to connect the core network 105 to IP network 110. Gateway 108 may be a packet gateway (PGW).

A plurality of mobile communication devices 102 shown in FIG. 1 may include mobile devices 122, 124, and 126. In general, mobile devices 102 may be cellular telephones, smartphones, laptop computers, tablet computers, and PDA's, to name but a few. Some of these mobile devices 102, such as mobile devices 122 and 126, may communicate with mobile network 104 directly through base stations 106, such as base stations 160 and 164, respectively.

At least one of the mobile devices in FIG. 1 may be a mobile device configured to operate as a mobile access point (AP), referred to and shown in FIG. 1 as a mobile AP device 150. In some implementations, mobile AP device 150 is a mobile device equipped with dual communication capabilities (e.g. both cellular and Wi-Fi), and configured to operate as a mobile AP to provide a mobile "hotspot" for communication devices (e.g. laptop and tablet computers, as well as suitably-equipped cellular telephones and smartphones).

Accordingly, as shown in FIG. 1, mobile AP device 150 may be configured to provide wireless communications over a first wireless connection 140 with a mobile device (e.g. mobile device 122) according a first communication protocol or standard, and provide wireless communications over a second wireless connection 146 with a mobile network (e.g. mobile network 104) according to the second communication protocol or standard. The first communication protocol may be a Wi-Fi or WLAN protocol, which is described in a group of specifications developed by the Institute of Electrical and Electronics Engineers (IEEE) referred to collectively as the IEEE 802.11 standard. The second communication protocol may be any suitable cellular telecommunications protocol or standard described in one of several various sets of specifications. Thus, first wireless connection 140 of mobile AP device 150 may be a WLAN connection, and second wireless connection 146 of mobile AP device 150 may be cellular network connection.

IP network 110 may be a packet data network, such as the Internet. A plurality of servers 170, such as servers 172, 174, and 176 may be connected to IP network 110. Control center 180 may also be connected to IP network 110. Operation of control center 180 and servers 172, 174, and 176 are described in further detail in relation to FIGS. 3-5 and 7-9, and pertinent components of control center 180 and server 176 are described later in relation to FIG. 11.

Gateway 108 is an interface between mobile network 104 and IP network 110, and facilitates communications between mobile devices 102 and servers/devices in IP network 110. Gateway 108 may include a rules database (DB) 112 for accessing a set of rules which enforce traffic policy decisions for mobile devices. The set of rules may be referred to as a "rulebase." The set of rules may describe the required traffic handling for a corresponding subscriber.

A policy server or function 190 may be connected to gateway 108. Policy function 192 may be a Policy and Charging Rules Function (PCRF). The policy function 192 or PCRF is configured to make charging enforcement decisions on behalf of gateway 108. Each time a mobile device connects to gateway 108 for communications, policy function 192 communicates to gateway 108 an indication or name of a selected set of rules in rules DB 112 to which gateway 108 applies to the communications of the mobile device.

Service monitor 190 may be connected to gateway 108. Service monitor 190 may be configured to monitor service and usage (e.g. data traffic usage) of at least some of mobile devices 102, such as mobile devices 122, 126, and 150. Service monitor 190 may be, for example, an Online Charging System (OCS). In general, the OCS is a system configured to provide a charging mechanism for a communication service provider, for example, to charge subscribers in real-time based on service usage. The OCS may be connected to gateway 108 via a standard interface "Gy".

Operation and other aspects of the entities in the communication system 100 of FIG. 1 will now be described in relation to FIGS. 2-11.

Figure 2:
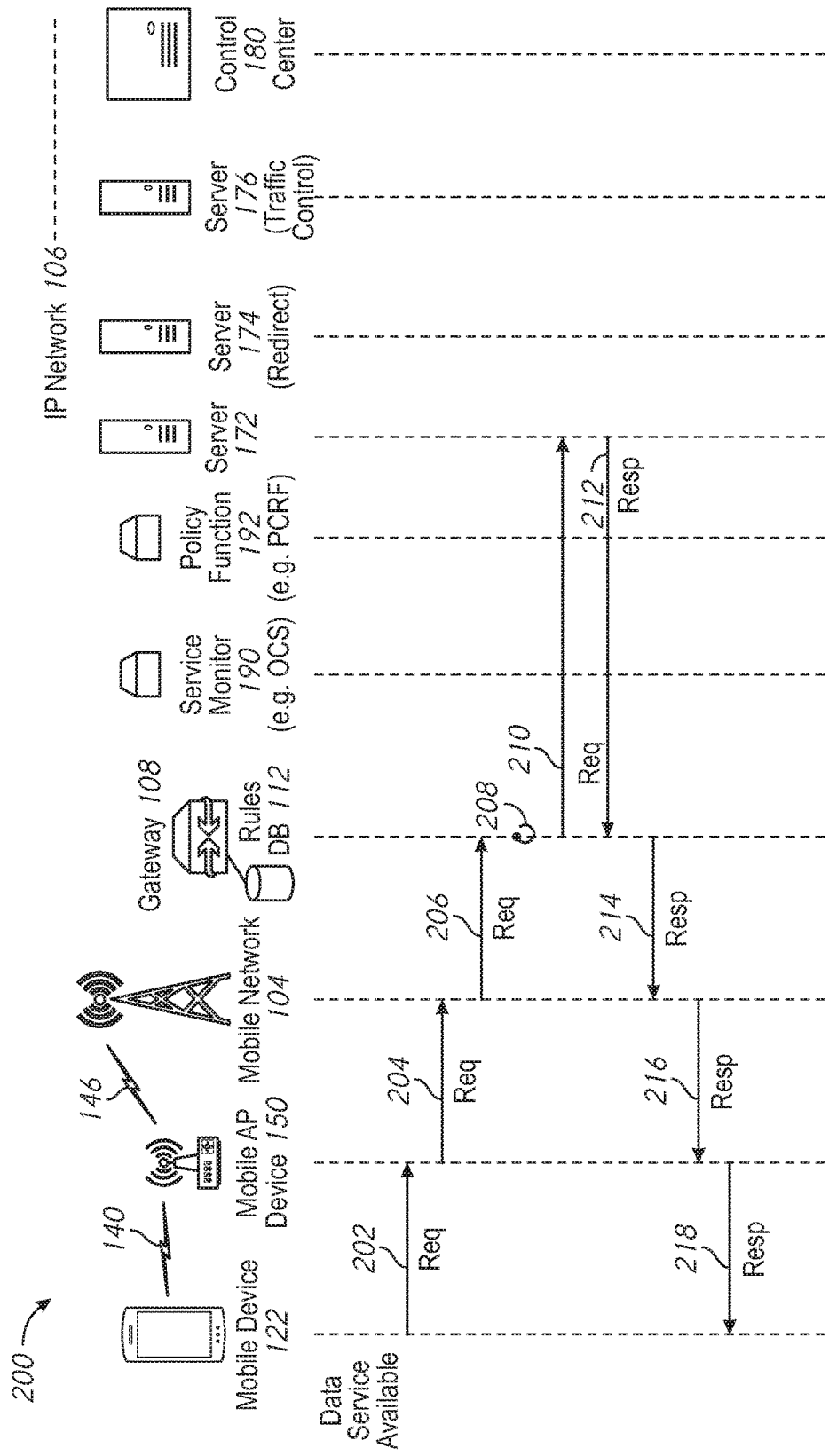
FIG. 2 is a message flow diagram for describing a method of communicating data traffic in a communication system when data service for a mobile AP device is available.

FIG. 2 is a message flow diagram 200 for describing a method of communicating data traffic in a communication system (e.g. communication system 100 of FIG. 1) when data service is available. When data service is available, data traffic may be communicated between a mobile device (e.g. mobile device 122 of FIG. 1) and a network (e.g. IP network 110) via a mobile AP device (e.g. mobile AP device 150 of FIGS. 1 and 10).

Initially, when mobile device 122 is moved within wireless coverage range of mobile AP device 150, an authentication procedure is performed between mobile device 122 and mobile AP device 150 to authenticate mobile device 122. In response to a successful authentication, mobile device 122 associates with mobile AP device 150 and establishes a network connection with IP network 110.

Sometime during operation, mobile device 122 communicates to mobile AP device 150 a request ("Req") to a server or device in IP network 110 (step 202 of FIG. 2). The request may originate from an application of mobile device 122 (e.g. a web browser application). Further, the request may be any suitable request (e.g. a Hypertext Transfer Protocol or HTTP request) destined to any suitable server or device (e.g. an HTTP server). Here, the request may be destined to server 172 of IP network 110. Mobile AP device 150 receives the request from mobile device 122.

In response to receiving the request, mobile AP device 150 sends to mobile network 104 a corresponding request (step 204 of FIG. 2). Here, mobile AP device 150 may perform one or more address translation functions for translating network and/or port addresses of the request. For example, mobile AP device 150 may perform a Network Address Translation (NAT) and/or a Port Address Translation (PAT) on the request before communicating the request to the mobile network 104.

The request is communicated to gateway 108 of mobile network 104 (step 206 of FIG. 2). Gateway 108 is configured to process the request of mobile AP device 150 in accordance with a set of rules in the rules DB 112 (step 208 of FIG. 2). When data service of mobile AP device 150 is available (e.g. the data service is not suspended), gateway 108 allows the request to be communicated to IP network 110 to reach server 174 (step 210 of FIG. 2).

Server 172 processes the request to generate a response. The response ("Resp") is sent by server 172 to gateway 108 (step 212 of FIG. 2) for further communication through mobile network 104 (step 214 of FIG. 2). Mobile network 104 communicates the response to mobile AP device 150 (step 216 of FIG. 2), which properly directs and communicates the response to mobile device 122 (step 218 of FIG. 2). Mobile AP device 150 may perform the one or more address translation functions for translating network and/or port addresses of the response for proper communication to mobile device 122.

Mobile device 122 receives and process the response. For example, if the request in step 202 is an HTTP GET request for a web page of server 172 from a web browser application, mobile device 122 receives and processes an HTTP response from server 172. The HTTP response may include web page data for visual display in the web browser application of the mobile device 122.

Figure 3:
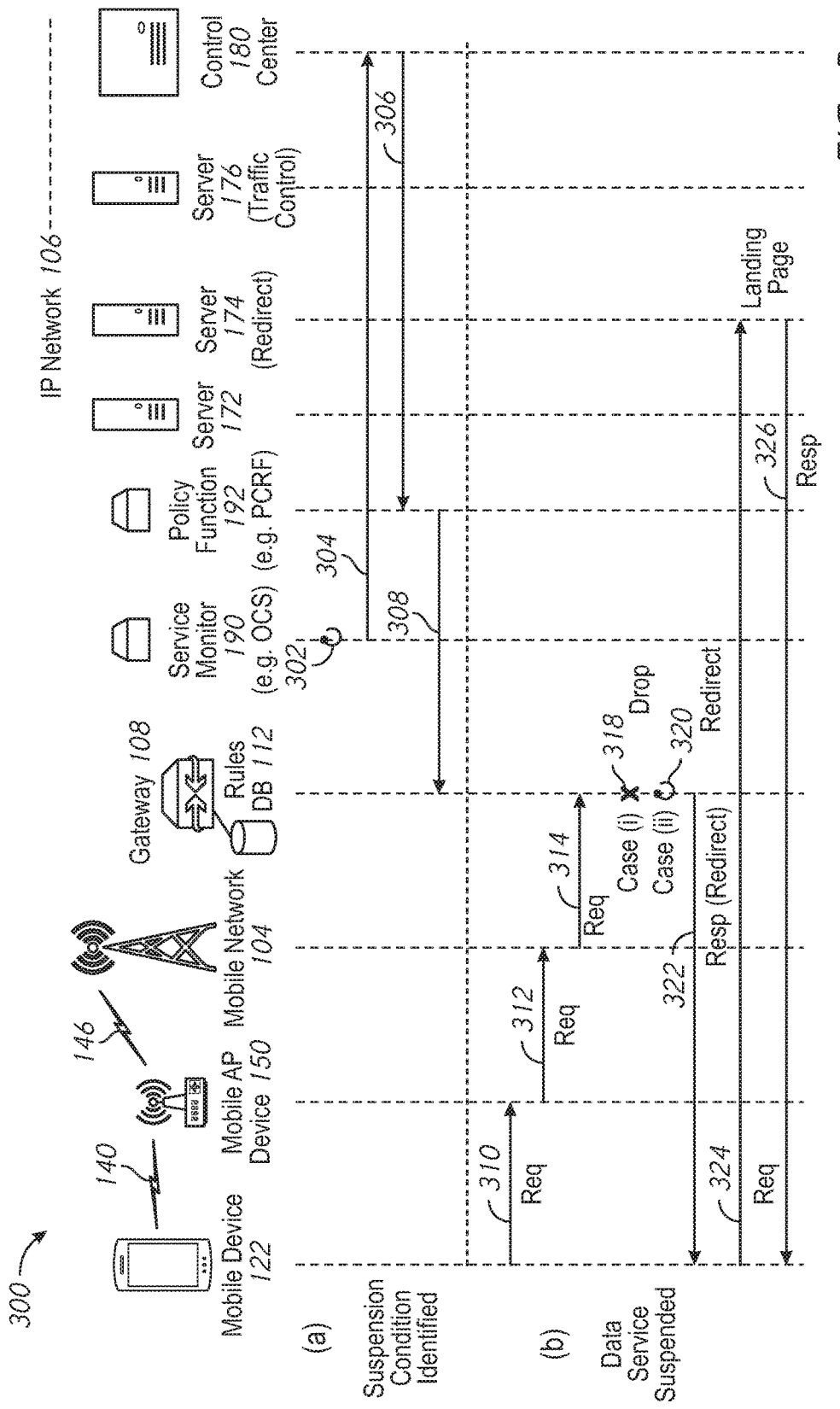
FIG. 3 is a message flow diagram for describing a method of controlling and communicating data traffic in a communication system when data service for a mobile AP device is suspended.

FIG. 3 is a message flow diagram 300 for describing a method of controlling and communicating data traffic in a communication system (e.g. communication system 100 of FIG. 1) when data service is suspended. When data service is suspended, control measures are taken to redirect data traffic from a mobile device (e.g. mobile device 122 of FIG. 1) which is sent through a mobile AP device (e.g. mobile AP device 150 of FIGS. 1 and 10). Note that, in the description of FIG. 3, mobile AP device 150, control center 180, and server 176 are not configured to perform techniques of the present disclosure for reducing data traffic while data service is suspended.

FIG. 3 is shown separated into FIGS. 3(*a*) and 3(*b*), where FIG. 3(*a*) illustrates the network measures taken to control data traffic based on identifying one or more conditions to suspend data service for mobile AP device 150 ("Suspension Condition Identified"), and FIG. 3(*b*) illustrates the communication of data traffic while the data service for mobile AP device 150 is suspended ("Data Service Suspended").

Referring specifically to FIG. 3(*a*), service monitor 190 (e.g. the OCS) is configured to monitor the service and usage (e.g. data traffic usage) of mobile devices, including mobile AP device 150. The service monitor 190 may identify a condition for suspending data service for mobile AP device 150 (step 302 of FIG. 3(*a*)). A condition for suspending data service may be or include any suitable condition, for example, a condition that data usage for mobile AP device 150 has exceeded a threshold, or a condition that allotted data units for mobile AP device 150 have been consumed (e.g. reached zero).

In response to identifying the condition, service monitor 190 may send a message to control center 180 (step 304 of FIG. 3). The message may be a request that subscriber data flow be redirected for mobile AP device 150. Such a message may be communicated by making an Application Programming Interface (API) call to the control center 180 to redirect subscriber data flow. Control center 180 receives this message.

In response to receiving the message, control center 180 may send a message to policy function 192 (e.g. the PCRF) to change or update the status or set of rules for mobile AP device 150 (step 306 of FIG. 3(*a*)). In response, policy function 192 may send or communicate to gateway 108 an indication or name of the updated set of rules in rules DB 112 to be applied (i.e. change in the "rulebase" name) (step 308 of FIG. 3(*a*)). The set of rules associated with mobile AP device 150 may be updated to redirect subscriber data flow for mobile AP device 150. Gateway 108 is configured to use the updated set of rules from the rules DB 112 to process future requests from mobile AP device 150 during the suspension of data service.

Step 308 above is performed when there is an active packet data session between mobile AP device 150 and gateway 108. In the 3GPP Gx interface standard, the message sent from policy function 102 (i.e. the PCRF) to gateway 108 (i.e. the PGW) is referred to as a Re-Auth-Request (RAR). On the other hand, when there is no active packet data session between mobile AP device 150 and gateway 108, policy function 192 stores the indication or name in its own database and sends it to gateway 108 when the data packet session is started. Here, in the 3GPP Gx interface standard, gateway 108 receives the rulebase name in a Credit-Control-Answer (CCA) in response to sending policy function 192 a Credit-Control-Request (CCR) query.

Reference is now made to FIG. 3(*b*), illustrating the communication of data traffic for mobile AP device 150 while the data service is suspended. Sometime during operation while data service is suspended for mobile AP device 150, mobile device 122 communicates to mobile AP device 150 a request ("Req") to a server or device in IP network 110 (step 310 of FIG. 3(*b*)). The request may originate from an application of mobile device 122 (e.g. a web browser application). The request may be any suitable request (e.g. an HTTP request) destined to any suitable server or device (e.g. an HTTP server). Here, the request may be destined to server 172 of IP network 110. Mobile AP device 150 receives the request from mobile device 122.

In response to receiving the request, mobile AP device 150 sends to mobile network 104 a corresponding request (step 312 of FIG. 3(*b*)). Here, the mobile AP device 150 may perform the address translation function for translating network and/or port addresses of the request. For example, the mobile AP device 150 may perform NAT and/or PAT before communicating the request to the mobile network 104. The request is communicated to gateway 108 of the mobile network (step 314 of FIG. 3(*b*)).

In general, when the data service of mobile AP device 150 is suspended, the updated rules used by gateway 108 do not allow the requests to be served or to be served as expected. The specific handling of a request may vary depending on the type of request. Some requests, for example, such as HTTP Secure (HTTPS) requests from a web browser application, may be handled in the manner depicted in Case (i) of FIG. 3(*b*). In Case (i), gateway 108 may simply "drop" or perform no action in relation to the request, refraining from performing any meaningful processing of the request (process 318 of FIG. 3(*b*)).

Other requests, such as requests for content, or HTTP GET requests from a web browser application, may be handled in the manner depicted in Case (ii) of FIG. 3(*b*). In this Case (ii), gateway 108 may generate a response indicating a redirect (step 320 of FIG. 3(*b*)) and send the response to the mobile device 122 via mobile network 104 and mobile AP device 150 (step 322 of FIG. 3(*b*)). The response may be an HTTP response which includes a specific indication to redirect (e.g. "status code=302") to a location indicated by a Uniform Resource Locator (URL) in a location header field. The location indicated by the URL is a landing page of server 174, which is used as a redirect server.

Note that server 174 may be owned, operated, and/or controlled by a manufacturer (i.e. the Original Equipment Manufacturer or OEM) of equipment within which mobile AP device 150 is integrated. Alternatively, server 174 may be owned, operated, and/or controlled by a mobile operator of mobile network 104 or a third party. For example, server 174 may be owned, operated, and controlled by the OEM of a vehicle or a "connected car" within which mobile AP device 150 may be integrated (see e.g. connected car 1020 of FIG. 10).

Mobile device 122 may automatically reply to the response of step 322, sending an otherwise similar or identical request as the original, but to the URL specified in the location header field (e.g. the specified URL for the landing page of server 174) (step 324 in FIG. 3(*b*)). In response, server 174 may generate and send to mobile device 122 a response which includes web page data of the landing page (step 326 of FIG. 3(*b*)). The landing page may be visually displayed in the web browser application of the mobile device 122. The landing page may indicate that the data service is suspended, and/or specify a way in which to restore the data service for mobile AP device 150.

For even other requests, such as Domain Name Server (DNS) requests, gateway 108 may allow communication to IP network 110 for appropriate processing, where mobile device 122 receives and processes the expected response. As is apparent, at least some of the basic underlying functionality for network communication (e.g. the translation of domain names into numeric IP addresses for locating and identifying services and devices) may still be maintained despite the data service being suspended.

FIG. 4 is a flowchart 400 for describing a method for use in controlling data traffic in a communication system (e.g. communication system 100 of FIG. 1). The method may be performed by a network entity, such as a control center (e.g. control center 180 of FIG. 1) or a server (e.g. server 176 of FIG. 1). Further, the method may involve communication with a mobile communication device configured to operate as a mobile AP ("mobile AP device") (e.g. mobile AP device 150 of FIGS. 1 and 10). Use of this method may result in a reduction of data traffic in suspended data service mode, as compared to the amount of data traffic that would be communicated with sole use of the technique described in relation to FIG. 3.

A mobile AP device may process data traffic associated with a mobile device in accordance with a selected one of a plurality of processing modes of operation. The plurality of processing modes may include at least a first processing mode of operation and a second processing mode of operation. The first processing mode may be referred to as an "available data service mode" of operation, and the second processing mode may be referred to as a "suspended data service mode" of operation. The mobile AP device is configured to connect the mobile device to an IP network via a mobile network and, when operating in the available data service mode, allow one or more requests from the mobile device to be sent to the mobile network for communication to a server or device in the IP network.

Initially, the mobile AP device operates in the available data service mode of operation. Beginning at a start block 402 of FIG. 4, a message indicating a need to change data traffic handling for the mobile AP device is received (step 404 of FIG. 4). In some implementations, the message may provide an instruction to redirect subscriber data flow for the mobile AP device. The need to change data traffic handling for the mobile AP device may be determined based on identifying one or more conditions for suspending data service for the mobile AP device. Thus, the message may be a message indicating that data service is or should be suspended for the mobile AP device.

A condition for suspending data service may be or include any suitable condition, for example, a condition that data usage for the mobile AP device has exceeded a threshold, or a condition that allotted data units for the mobile AP device have been consumed (e.g. reached zero). Other conditions for suspending data service may include identifying an unauthorized or inappropriate use of the mobile AP device, including identifying suspected malicious use of the mobile AP device (e.g. a suspected cyberattack or Distributed Denial of Service or DDoS attack).

In response to receiving the message in step 404, one or more messages which instruct the mobile AP device to change data traffic handling are sent to the mobile AP device via the mobile network (step 406 of FIG. 4). The one or more messages cause the mobile AP device to operate in the suspended data service mode of operation. More particularly, the one or more messages may instruct the mobile AP device to process one or more requests from a mobile device in accordance with one or more rules stored in memory of the mobile AP device in order to change its data traffic handling. The one or more rules include at least one rule for disallowing the one or more requests from being sent to the mobile network, to prohibit the communication of the one or more requests to the server or device in the IP network. The flowchart 400 ends at an end block 408 of FIG. 4.

In some implementations of the method of FIG. 4, the message sent in step 406 may enable or activate one or more rules previously stored in memory of the mobile AP device. In addition, or alternatively, the one or more rules may be sent to the mobile AP device over the mobile network in the one or more messages of step 406, or alternatively in one or more previous or subsequent messages.

FIG. 5 is a flowchart for describing a method of controlling data traffic in a communication system (e.g. communication system 100 of FIG. 1). The method may be performed by a mobile communication device configured to operate as a mobile AP ("mobile AP device") (e.g. mobile AP device 150 of FIGS. 1 and 10). Further, the method may involve communication with a network entity, such as a control center or server (e.g. control center 180 or server 176 of FIGS. 1 and 11). Use of this method may result in a reduction of data traffic during operation in a suspended data service mode as compared to the amount of data traffic that would be communicated with sole use of the technique described in relation to FIG. 3.

As described earlier above, the mobile AP device may process data traffic associated with a mobile device in accordance with a selected one of a plurality of processing modes of operation. The plurality of processing modes may include at least a first processing mode of operation and a second processing mode of operation. The first processing mode may be referred to as an "available data service mode" of operation, and the second processing mode may be referred to as a "suspended data service mode" of operation. The mobile AP device is configured to connect the mobile device to an IP network via a mobile network and, when operating in the available data service mode, allow one or more requests from the mobile device to be sent to the mobile network for communication to a server or device in the IP network.

Initially, the mobile AP device operates in the available data service mode of operation. Beginning at a start block 502 of FIG. 5, one or more messages which instruct a change in data traffic handling for the mobile AP device are received (step 504 of FIG. 5). The one or more messages will cause the mobile AP device to operate in the suspended data service mode of operation.

More particularly, the one or more messages may instruct the mobile AP device to process one or more requests from a mobile device in accordance with the one or more rules stored in memory of the mobile AP device. After receiving the one or more messages, mobile AP device 150 operates to process one or more requests from the mobile device in accordance with the one or more rules, for operation in the suspended data service mode (step 506 of FIG. 5). The one or more rules include at least one rule for disallowing the one or more requests from being sent to the mobile network, to prohibit the communication of the one or more requests to the server or device in the IP network. The flowchart 500 ends at an end block 508 of FIG. 5.

In some implementations of the method of FIG. 5, the one or more messages received in step 504 may enable or activate one or more rules previously stored in memory of the mobile AP device. Alternatively, the one or more messages received in step 504 include the one or more rules for storage in memory of the mobile AP device for processing the one or more requests.

Further, in some implementations of the method of FIG. 5, the message in step 504 may be sent from the network based on the identification of one or more conditions for suspending data service for the mobile AP device. A condition for suspending data service may be or include any suitable condition, for example, a condition that data usage for the mobile AP device has exceeded a threshold, or a condition that allotted data units for the mobile AP device have been consumed (e.g. reached zero). Other conditions for suspending data service may include identifying an unauthorized or inappropriate use of the mobile AP device, including identifying suspected malicious use of the mobile AP device (e.g. a suspected cyberattack or DDoS attack).

Figure 6:
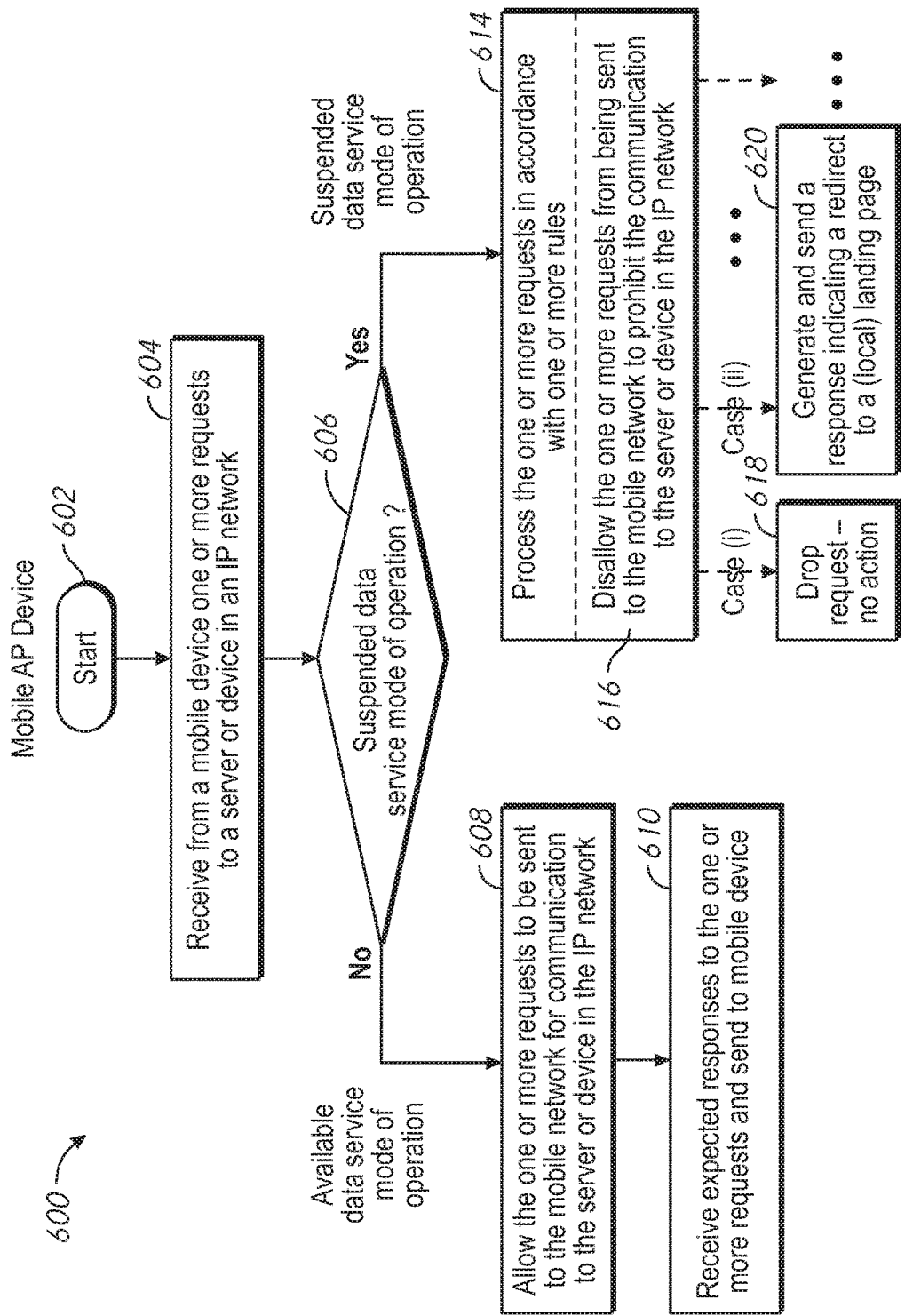
FIG. 6 is a flowchart for describing a method of controlling data traffic by a mobile AP device of a communication system, which may be used for reducing data traffic when data service for the mobile AP device is suspended.

FIG. 6 is a flowchart 600 for describing a method of controlling data traffic by a mobile AP device (e.g. mobile AP device of FIGS. 1 and 10) in a communication system (e.g. communication system 100 of FIG. 1). The method may involve communication with a mobile communication device (e.g. mobile device 122 of FIG. 1). Use of this method may result in a reduction of data traffic during a suspended data service mode as compared to the amount of data traffic that would be communicated with sole use of the technique described in relation to FIG. 3.

In general, the mobile AP device is configured to connect a mobile device to an IP network via a mobile network. The mobile AP device may process data traffic associated with the mobile device in accordance with a selected one of a plurality of processing modes of operation. The plurality of processing modes may include at least a first processing mode of operation and a second processing mode of operation. The first processing mode may be referred to as an "available data service mode" of operation, and the second processing mode may be referred to as a "suspended data service mode" of operation.

Beginning at a start block 602 of FIG. 6, one or more requests from a mobile device to a server or device in an IP network are received (step 604 of FIG. 6). When the selected processing mode is the first processing mode of operation (e.g. the data service available mode) (step 606 of FIG. 6), the one or more requests are allowed to be sent to the mobile network, for communication to the server or device in the IP network (step 608 of FIG. 6). Here, one or more (expected) responses from the server or device in the IP network may be received via the mobile network, and these responses are sent to the mobile device (step 610 of FIG. 6).

When the selected processing mode is the second processing mode of operation (e.g. the suspended data service mode) (step 606 of FIG. 6), the one or more requests are processed in accordance with one or more rules (step 614 of FIG. 6). With use of the one or more rules, the one or more requests are disallowed from being sent to the mobile network, to prohibit the communication to the server or device in the IP network (step 616 of FIG. 6).

While many or some of the requests may be disallowed in the suspended data service mode of operation, other requests may invoke alternative processing or even be allowed. More particularly, the specific action taken for a request may vary and depend on one or more values of one or more parameters associated with the request. Examples of request parameters include the type of request (e.g. a HTTP GET request), the origin of the request, the type of application that originated the request (e.g. a web browser application or other), the destination of the request (e.g. a server or device IP address, and/or TCP or UDP port number), the state or mode of the mobile AP device, and other suitable parameters.

A rule may indicate one or more predetermined values of one or more request parameters to detect or identify in a request (e.g. by the comparison of values), as well as an associated action (if any) to be taken in response to the identification. In some implementations, the rules may be or include a list of one or more predetermined values of one or more request parameters associated with allowable requests (e.g. a whitelist of allowable requests). In addition, or alternatively, the rules may be or include a list of one or more predetermined values of one or more request parameters associated with disallowable requests (e.g. a blacklist of disallowable requests). Note that a blacklist of disallowable requests may be implicit, for example, as those requests that are not indicated in an explicit whitelist of allowable requests. Conversely, a whitelist of allowable requests may be implicit, for example, as those requests that are not indicated in an explicit blacklist of disallowable requests.

A few examples are provided for illustration in the "Cases" indicated after step 616 of FIG. 6. Some requests, such as HTTP Secure (HTTPS) requests (e.g. requests which may be destined to TCP port 443), which may originate from a web browser application of the mobile device, may be handled in the manner depicted in Case (i) of FIG. 6. In Case (i), the one or more rules may specify to simply "drop" or perform no meaningful action to serve the request (step 618 of FIG. 6). Any response provided to mobile device 122 in relation to step 618 is not the expected response to the request, but rather an unexpected response.

Other requests, such as requests for content, or HTTP GET requests from a web browser application of the mobile device, may be handled in the manner depicted in Case (ii) of FIG. 6. In this Case (ii), a response indicating a redirect to a landing page is generated and sent by the mobile AP device to the mobile device (step 620 of FIG. 6). Here, the landing page may be a local landing page hosted by the mobile AP device. In other implementations, the landing page is hosted in the network (e.g. a network server). The response may be an HTTP response which includes a specific indication to redirect (e.g. "status code=302") to a URL specified in a location header field which indicates the location to redirect.

The mobile device may automatically reply to this response, sending an otherwise similar or identical request as the original but directed to the URL specified in the location header field. The request to the URL may be serviced by the mobile AP device, or alternatively the network server. A response which includes web page data of the landing page may be generated and sent to the mobile device in response to this request. The landing page may be visually displayed in the web browser application of the mobile device. The landing page may indicate that the data service is suspended, and/or specify a manner by which to restore the data service (e.g. a telephone number to call for restoring service, a link to a web page for restoring service, or both).

Even other requests, such as Domain Name Server (DNS) requests (e.g. requests which may be destined to UDP port 43), may be allowed to be communicated to the mobile network for appropriate handling. Here, the mobile device may receive the expected response to the request. As is apparent, at least some basic underlying services for network communication (e.g. DNS translation of domain names into numeric IP addresses for locating and identifying services and devices) may still be provided despite data service being suspended.

Figure 7:
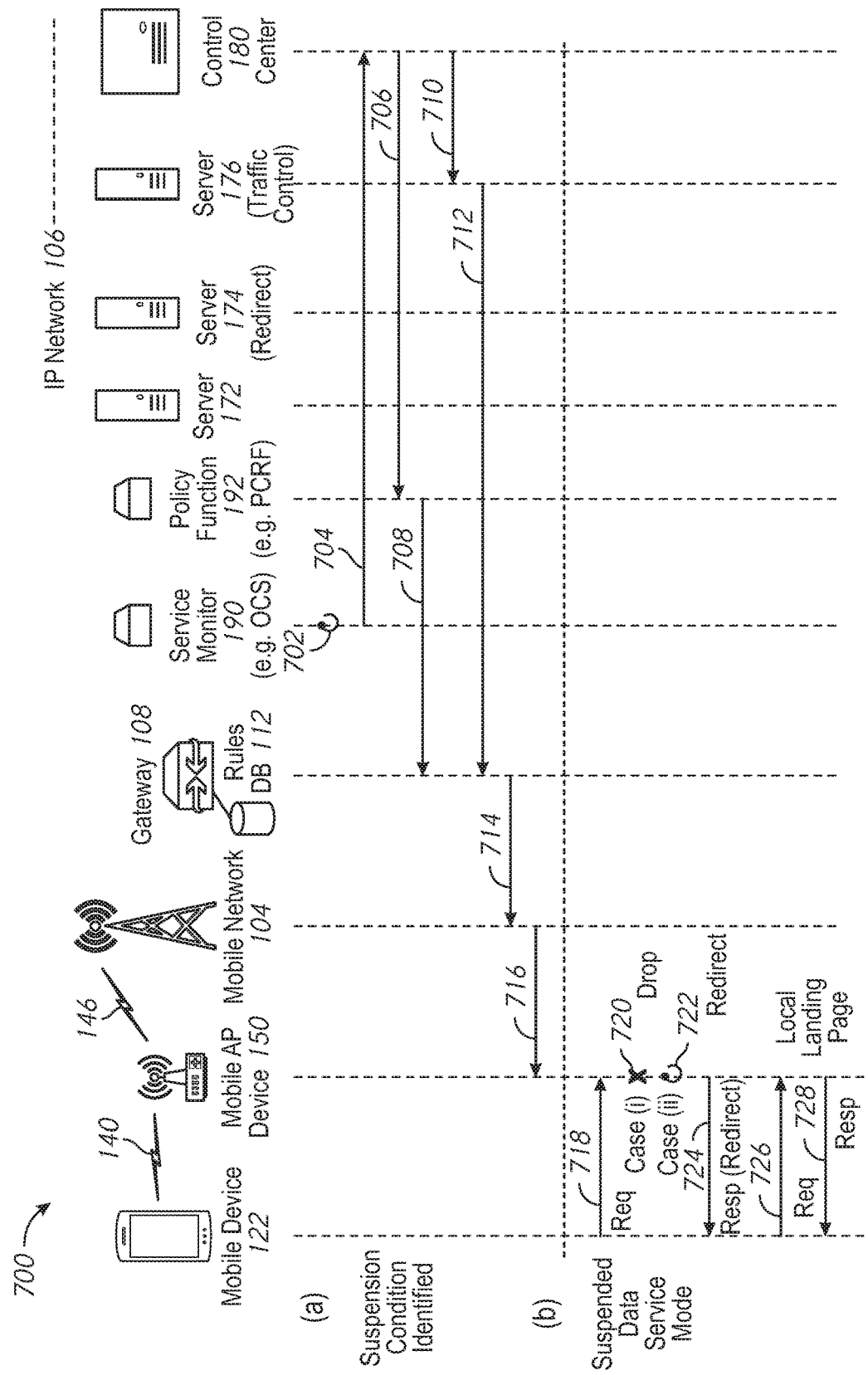
FIG. 7 is a message flow diagram for describing a method of controlling and communicating data traffic in a communication system, which may be used for reducing data traffic when data service for a mobile AP device is suspended.

FIG. 7 is a message flow diagram 700 for describing a method of controlling and communicating data traffic in a communication system (e.g. communication system 100 of FIG. 1) when data service is suspended.

In the description of FIG. 7, mobile AP device 150, control center 180, and server 176 are configured to perform techniques of the present disclosure for reducing data traffic while data service is suspended. Accordingly, use of this method may result in a reduction of data traffic during a suspended data service mode of operation as compared to the amount of data traffic that would be communicated with sole use of the technique described in relation to FIG. 3.

FIG. 7 is divided into FIGS. 7(*a*) and 7(*b*), where FIG. 7(*a*) illustrates network measures that may be taken to control data traffic based on identifying one or more conditions to suspend data service for mobile AP device 150 ("Suspension Condition Identified"), and FIG. 7(*b*) illustrates some examples of the communication of data traffic during a suspended data service mode of operation of mobile AP device 150.

Referring specifically to FIG. 7(*a*), service monitor 190 (e.g. the OCS) is configured to monitor the service and usage (e.g. data traffic usage) of mobile devices, including mobile AP device 150. Service monitor 190 may identify a condition for suspending data service for mobile AP device 150 (step 702 of FIG. 7(*a*)).

A condition for suspending data service may be or include any suitable condition, for example, a condition that data usage for mobile AP device 150 has exceeded a threshold, or a condition that a data usage allowance for mobile AP device 150 has been consumed (e.g. reached zero). Other conditions for suspending data service may include identifying an unauthorized or inappropriate use of the mobile AP device, including identifying suspected malicious use of mobile AP device (e.g. a suspected cyberattack or DDoS attack by or through mobile AP device 150).

In response to identifying the condition, service monitor 190 may send a message to control center 180 (step 704 of FIG. 7(*a*)). Control center 180 receives this message. The message may indicate or instruct a change in data traffic handling for mobile AP device 150. In addition, or alternatively, the message may indicate or instruct a suspension in data service for mobile AP device 150. Also in addition, or alternatively, the message may redirect subscriber data flow for mobile AP device 150. Such a message may be communicated by making an API call to the control center 180 to control or redirect subscriber data flow.

In response to receiving the message, control center 180 may send a message to policy function 192 (e.g. the PCRF) to change or update the status or set of rules for mobile AP device 150 (step 706 of FIG. 7(*a*)). In response, policy function 192 may send or communicate to gateway 108 an indication or name of the updated set of rules in rules DB 112 to be applied (i.e. change in the "rulebase" name) (step 708 of FIG. 7(*a*)). The set of rules associated with mobile AP device 150 may be updated to redirect subscriber data flow for mobile AP device 150. Gateway 108 is configured to use the updated set of rules from the rules DB 112 to process future requests from mobile AP device 150 during the suspension of data service.

Step 708 above is performed when there is an active packet data session between mobile AP device 150 and gateway 108. In the 3GPP Gx interface standard, the message sent from policy function 102 (i.e. the PCRF) to gateway 108 (i.e. the PGW) is referred to as a Re-Auth-Request (RAR). On the other hand, when there is no active packet data session between mobile AP device 150 and gateway 108, policy function 192 stores the indication or name in its own database and sends it to gateway 108 when the data packet session is started. Here, in the 3GPP Gx interface standard, gateway 108 receives the rulebase name in a Credit-Control-Answer (CCA) in response to sending policy function 192 a Credit-Control-Request (CCR) query.

Further in response to receiving the message in step 704, control center 180 may send to server 176 a message to further control the data traffic associated with mobile AP device 150 (step 710 of FIG. 7(*a*)). Server 176, which may be referred to as a traffic control server or mobile AP device manager, may receive this message. The message may indicate a need to change data traffic handling for mobile AP device 150. In addition, or alternatively, the message may indicate or instruct a suspension in data service for mobile AP device 150. Also in addition, or alternatively, the message may be a message to redirect data flow for mobile AP device 150. Such a message may be communicated by making an API call (e.g. a push API) to server 176 to control or redirect subscriber data flow.

In some implementations, server 176 may be owned, operated, and/or controlled by a manufacturer (i.e. the Original Equipment Manufacturer or OEM) of equipment within which mobile AP device 150 is incorporated. In one example, server 174 may be owned, operated, and controlled by the OEM of a vehicle or a "connected car" within which mobile AP device 150 is integrated (see e.g. connected car 1020 of FIG. 10). Thus, the OEM has an existing communication mechanism to establish and maintain a secure wireless channel with the device for purposes of diagnostics, firmware updates, etc. The existing communication mechanism may be utilized for the message communication described in relation to FIG. 7(*a*). In some implementations, server 176 may be connected in a private network of the OEM. Alternatively, server 176 may be owned, operated, and/or controlled a mobile operator of mobile network 104 or a third party.

In response to receiving the message in step 710, server 176 may send one or more messages to mobile AP device 150. The one or more messages from server 176 are sent through gateway 108 (step 712 of FIG. 7(*a*)) to mobile network 104 (step 714 of FIG. 7(*a*)) for transmission to mobile AP 150 (step 716 of FIG. 7(*a*)). The one or more messages may instruct the mobile AP device 150 to change data traffic handling. In addition, or alternatively, the message may indicate or instruct a suspension in data service for mobile AP device 150. Also in addition, or alternatively, the message may be a message to redirect data flow.

More particularly, the one or more messages may instruct mobile AP device 150 to process one or more requests from mobile device 122 in accordance with one or more rules during a suspended data service mode. The one or more rules may include rules for disallowing the one or more requests from being sent to mobile network 104, to prohibit the communication of the one or more requests to the appropriate server or device in IP network 110.

Note that the set of rules may be part of or associated with what is referred to as a Traffic Handling Template (THT). A THT is a description of the rules that must be applied to process data traffic while in the suspended data service mode.

In some implementations, the one or more messages sent in step 712 may enable or activate one or more rules previously stored in memory of mobile AP device 150. In addition, or alternatively, the one or more rules may be sent to mobile AP device 150 over the mobile network in one or more messages of step 712, or alternatively in one or more previous or subsequent messages.

Reference is now made to FIG. 7(*b*), illustrating the handling and communication of data traffic by mobile AP device 150 during the suspended data service mode of operation, after the network measures in FIG. 7(*a*) to control data traffic are taken.

Sometime during operation, mobile device 122 communicates to mobile AP device 150 a request ("Req") to a server or device in IP network 110 (step 718 of FIG. 3(*b*)). The request may originate from an application of mobile device 122 (e.g. a web browser application). The request may be any suitable request (e.g. an HTTP request) destined to any suitable server or device (e.g. an HTTP server). Here, the request may be destined to server 172 of IP network 110. Mobile AP device 150 receives the request from mobile device 122.

Again, mobile AP device 150 is operating in the suspended data service mode. Thus, in response to receiving the request in step 718, mobile AP device 150 processes the one or more requests in accordance with one or more rules stored in its memory. These rules may have been enabled or activated in response to receiving the one or more messages from server 176 in steps 712, 714, and 716 of FIG. 7(*a*). The one or more rules may have been previously stored in the memory of mobile AP device 150, or alternatively may have been received in the one or more messages from server 176 in steps 712, 714, and 716 of FIG. 7(*a*). In any event, with use of the one or more rules, the one or more requests are disallowed from being sent to mobile network 104, to prohibit the communication to the server or device in the IP network.

While many or some of the requests may be disallowed in the suspended data service mode of operation, other requests may invoke alternative processing or even be allowed. More particularly, the specific action taken for a request may vary and depend on one or more values of one or more parameters associated with the request. Examples of request parameters include the type of request (e.g. a HTTP GET request), the origin of the request, the type of application that originated the request (e.g. a web browser application or other), the destination of the request (e.g. a server or device IP address, and/or TCP or UDP port number), the state or mode of mobile AP device 150, and other suitable parameters.

A rule may indicate one or more predetermined values of one or more request parameters to detect or identify in a request (e.g. by the comparison of values), as well as an associated action (if any) to be taken in response to the identification. In some implementations, the rules may be or include a list of one or more predetermined values of one or more request parameters associated with allowable requests (e.g. a whitelist of allowable requests). In addition, or alternatively, the rules may be or include a list of one or more predetermined values of one or more request parameters associated with disallowable requests (e.g. a blacklist of disallowable requests). Note that a blacklist of disallowable requests may be implicit, for example, as those requests that are not indicated in an explicit whitelist of allowable requests. Conversely, a whitelist of allowable requests may be implicit, for example, as those requests that are not indicated in an explicit blacklist of disallowable requests.

A few examples are provided for illustration in the "Cases" indicated after step 718 of FIG. 7(*b*). Some requests, such as HTTP Secure (HTTPS) requests (e.g. requests which may be destined to TCP port 443), which may originate from a web browser application of mobile device 122, may be handled in the manner associated with Case (i) of FIG. 7(*b*). In Case (i), the one or more rules may specify to simply "drop" or perform no meaningful action to serve the request (step 720 of FIG. 7(*b*)). Any response provided to mobile device 122 in relation to the request sent in step 718 is not an expected response to the request, but rather an unexpected response.

Other requests, such as requests for content, or HTTP GET requests from a web browser application of mobile device 122, may be handled in the manner associated with Case (ii) of FIG. 7(*b*). In this Case (ii), a response indicating a redirect to a landing page is generated (step 722 of FIG. 7(*b*)) and sent by mobile AP device 150 to mobile device 122 (step 724 of FIG. 6). Here, the landing page may be hosted by mobile AP device 150. In other implementations, the landing page is hosted in the network (e.g. by a network server). The response may be an HTTP response which includes a specific indication to redirect (e.g. "status code=302") to a URL specified in a location header field which indicates the location to redirect.

Mobile device 122 may automatically reply to this response, sending an otherwise similar or identical request as the original but directed to the URL specified in the location header field (step 726 of FIG. 7(*b*)). The request to the URL hosted by mobile AP device 150 may be serviced by mobile AP device 150, or alternatively by the network server. In particular, a response which includes web page data of the landing page may be generated and sent to the mobile device in response to this request (step 728 of FIG. 7(*b*)). The landing page may be visually displayed in the web browser application of mobile device 122. The landing page may indicate that the data service is suspended, and/or specify a manner by which to restore the data service (e.g. a telephone number to call for restoring service, a link or URL to a web page for restoring service, or both).

Even other requests, such as Domain Name Server (DNS) requests (e.g. requests which may be destined to UDP port 43), may be allowed to be communicated to mobile network 104 for appropriate handling (not illustrated in FIG. 7). Here, mobile device 122 may receive an expected response to the request. As is apparent, at least some basic underlying services for network communication (e.g. DNS translation of domain names into numeric IP addresses for locating and identifying services and devices) may still be provided in the suspended data service mode.

Again, use of the methods described in relation to FIG. 7 (or any other suitable variation thereof) may result in a reduction of data traffic in in a suspended data service mode of operation, as compared to the amount of data traffic that would be communicated with sole use of the technique described in relation to FIG. 3. Compare, for example, the illustrated steps of FIG. 3(*b*) with the illustrated steps of FIG. 7(*b*). As is apparent from FIG. 7(*b*), it may not be necessary for mobile AP device 150 to transmit to mobile network 104 any of the data traffic from mobile device 122. Mobile AP device 150 may be a small, battery-powered device, where considerations such as power conservation and heat are important. Further, it may not be necessary for mobile network 104, gateway 108, and the servers to receive or process any of the data traffic from mobile device 122 during the data service suspension. Even the redirection of data traffic in accordance with the present disclosure may be handled entirely locally (e.g. by mobile AP device 150) without burdening mobile network 150, IP network 110, or the servers (see e.g. steps 724, 726, and 728 of FIG. 7(*b*)). Note that a service cost may be associated with redirected communications of steps 322, 324, and 326 of FIG. 3(*b*) during the data service suspension. Without appropriate handling of the data traffic during the data service suspension, this service cost could undesirably be passed on to the subscriber or the OEM (e.g. the OEM of the "connected car" 1040 of FIG. 10). Finally, note further that any requests intended to be disallowed but inadvertently allowed by mobile AP device 150 to mobile network 104 may still be appropriately redirected in the network, since the rules DB 112 is changed to redirect data traffic in step 706 of FIG. 7(*a*) when data service is suspended.

Figure 8:
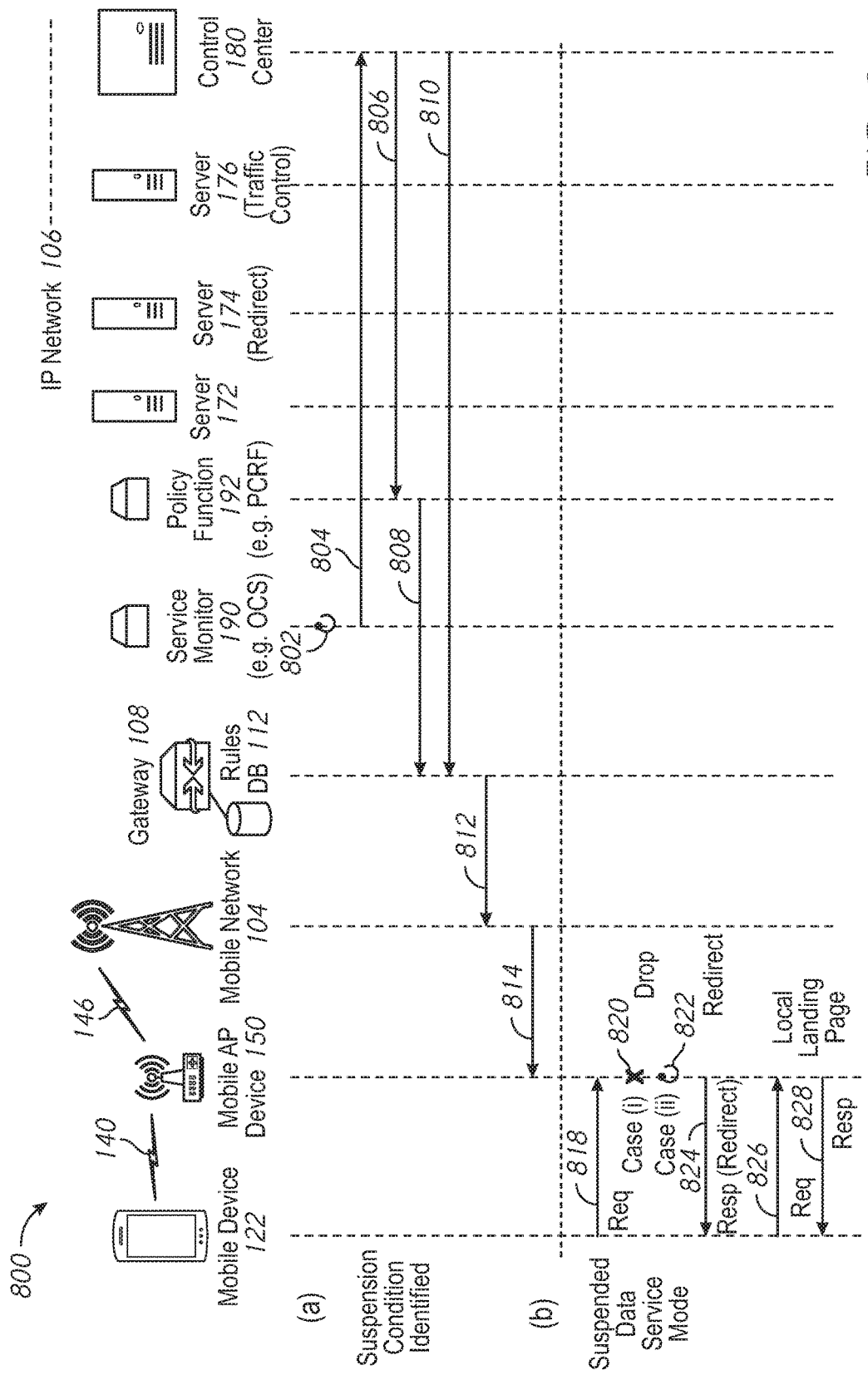
FIG. 8 is a message flow diagram for describing a method of controlling and communicating data traffic in a communication system, which may be used for reducing data traffic when data service for a mobile AP device is suspended.

FIG. 8 is a message flow diagram 800 for describing a method of controlling and communicating data traffic in a communication system (e.g. communication system 100 of FIG. 1) when data service is suspended. Note that the method of FIG. 8 is a variation to the method of FIG. 7, where use of server 176 may be omitted.

In the description of FIG. 8, mobile AP device 150 and control center 180 are configured to perform techniques of the present disclosure for reducing data traffic while data service is suspended. Accordingly, use of this method may result in a reduction of data traffic in a suspended data service mode of operation as compared to the amount of data traffic that would be communicated with sole use of the technique described in relation to FIG. 3.

FIG. 8 is divided into FIGS. 8(*a*) and 8(*b*), where FIG. 8(*a*) illustrates network measures that may be taken to control data traffic based on identifying one or more conditions to suspend data service for mobile AP device 150 ("Suspension Condition Identified"), and FIG. 8(*b*) illustrates some examples of the communication of data traffic during a suspended data service mode of operation of mobile AP device 150.

Referring specifically to FIG. 8(*a*), service monitor 190 (e.g. the OCS) is configured to monitor the service and usage (e.g. data traffic usage) of mobile devices, including mobile AP device 150. The service monitor 190 may identify a condition for suspending data service for mobile AP device 150 (step 802 of FIG. 8(*a*)).

A condition for suspending data service may be or include any suitable condition, for example, a condition that data usage for mobile AP device 150 has exceeded a threshold, or a condition that a data usage allowance for mobile AP device 150 has been consumed (e.g. reached zero). Other conditions for suspending data service may include identifying an unauthorized or inappropriate use of the mobile AP device, including identifying suspected malicious use of mobile AP device (e.g. a suspected cyberattack or DDoS attack by or through mobile AP device 150).

In response to identifying the condition, service monitor 190 may send a message to control center 180 (step 804 of FIG. 8(*a*)). Control center 180 receives this message. The message may indicate or instruct a change in data traffic handling for mobile AP device 150. In addition, or alternatively, the message may indicate or instruct a suspension in data service for mobile AP device 150. Also in addition, or alternatively, the message may redirect subscriber data flow for mobile AP device 150. Such a message may be communicated by making an API call to the control center 180 to control or redirect subscriber data flow.

In response to receiving the message, control center 180 may send a message to policy function 192 (e.g. the PCRF) to change or update the status or set of rules for mobile AP device 150 (step 806 of FIG. 8(*a*)). In response, policy function 192 may send or communicate to gateway 108 an indication or name of the updated set of rules in rules DB 112 to be applied (i.e. change in the "rulebase" name) (step 808 of FIG. 8(*a*)). The set of rules associated with mobile AP device 150 may be updated to redirect subscriber data flow for mobile AP device 150. Gateway 108 is configured to use the updated set of rules from the rules DB 112 to process future requests from mobile AP device 150 during the suspension of data service.

Step 808 above is performed when there is an active packet data session between mobile AP device 150 and gateway 108. In the 3GPP Gx interface standard, the message sent from policy function 102 (i.e. the PCRF) to gateway 108 (i.e. the PGW) is referred to as a Re-Auth- Request (RAR). On the other hand, when there is no active packet data session between mobile AP device 150 and gateway 108, policy function 192 stores the indication or name in its own database and sends it to gateway 108 when the data packet session is started. Here, in 3GPP Gx interface standard, gateway 108 receives the rulebase name in a Credit-Control-Answer (CCA) in response to sending policy function 192 a Credit-Control-Request (CCR) query.

Further in response to receiving the message in step 804, control center 180 may send one or more messages to mobile AP device 150. The one or more messages from control center 180 are sent through gateway 108 (step 810 of FIG. 8(*a*)) to mobile network 104 (step 812 of FIG. 8(*a*)) for transmission to mobile AP 150 (step 814 of FIG. 8(*a*)). The one or more messages may instruct the mobile AP device 150 to change data traffic handling. In addition, or alternatively, the message may indicate or instruct a suspension in data service (e.g. operate in the suspended data service mode) for mobile AP device 150. Also in addition, or alternatively, the message may be a message to redirect data flow.

In particular, the one or more messages may instruct mobile AP device 150 to process one or more requests from mobile device 122 in accordance with one or more rules during a suspended data service mode of operation. The one or more rules may include rules for disallowing the one or more requests from being sent to mobile network 104, to prohibit the communication of the one or more requests to the appropriate server or device in IP network 110.

In some implementations, the one or more messages sent in step 810 may enable or activate one or more rules previously stored in memory of mobile AP device 150. In addition, or alternatively, the one or more rules may be sent to mobile AP device 150 via mobile network 104 in the one or more messages of step 810, or alternatively in one or more previous or subsequent messages.

In FIG. 8(*a*), it is noted that the previous use of server 176 described in relation to FIG. 7 is not needed. In such an implementation, control center 180 may be configured to operate with an Integrated Device Management function.

Referring now to FIG. 8(*b*), what is shown illustrates the handling and communication of data traffic for mobile AP device 150 in the suspended data service mode of operation, after the network measures taken in FIG. 8(*a*) to control data traffic based on identifying one or more conditions to suspend data service. Note that the operation of mobile AP device 150 and the communication of data traffic in FIG. 8(*b*) may be the same as or similar to the operation and communication described previously in relation to FIG. 7(*b*), where steps 718-728 of FIG. 7(*b*) correspond to steps 818-828 of FIG. 8(*b*), respectively. Therefore, reference is made to the description corresponding to steps 718-728 of FIG. 7(*b*) to avoid unnecessary repetition.

Figure 9:
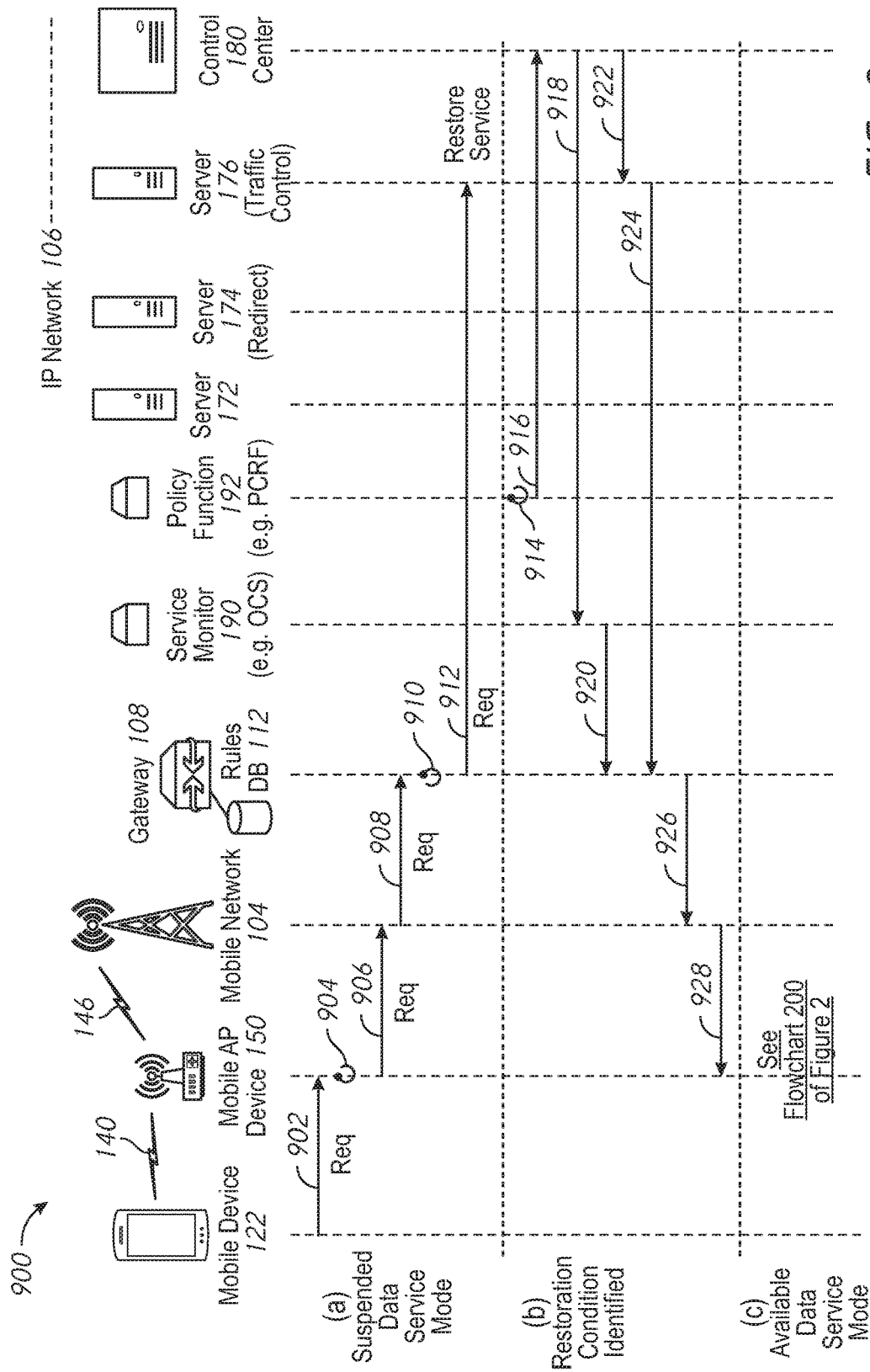
FIG. 9 is a message flow diagram for describing a method of controlling and communicating data traffic in a communication system, which may be used for restoring data service for the mobile AP device.

FIG. 9 is a message flow diagram 900 for describing a method of controlling and communicating data traffic in a communication system (e.g. communication system 100 of FIG. 1) when data service is suspended, which is for use in restoring data service for mobile AP device 150. In the description of FIG. 9, mobile AP device 150, control center 180, and server 176 are configured to perform techniques of the present disclosure.

FIG. 9 is divided into FIGS. 9(*a*), 9(*b*), and 9(*c*), where FIG. 9(*a*) illustrates an example of a communication of data traffic during a suspended data service mode of operation of mobile AP device 150 for restoring data service, FIG. 9(*b*) illustrates network measures that may be taken to control data traffic based on identifying one or more conditions to restore the data service for mobile AP device 150 ("Restoration Condition Identified"), and FIG. 9(*c*) indicates the communication of data traffic during an available data service mode of operation of mobile AP device 150.

Referring specifically to FIG. 9(*a*), an example of the communication of data traffic during a suspended data service mode of operation of mobile AP device 150 for restoring data service is shown. Previously, in relation to FIG. 7(*b*) or 8(*b*), mobile AP device 150 performed processing to redirect a request from mobile device 122 to a local landing page of mobile AP device 150. See e.g. steps 718 and Case (ii) steps 722, 724, 726 and 728 of FIG. 7(*b*), and/or steps 818 and Case (ii) steps 822, 824, 826, and 828 of FIG. 8(*b*). The landing page may have been visually displayed in a web browser application of mobile device 122. The landing page may have indicated that the data service is suspended, and/or specify a manner by which to restore the data service (e.g. providing a telephone number to call for restoring service, a link or URL to a web page for restoring service, or both).

Accordingly, mobile device 122 sends to mobile AP device 150 a request (e.g. an HTTP GET request) to the link or URL provided in the local landing page (step 902 of FIG. 9(*a*)). The link or URL may be destined to a server (e.g. server 176) for restoring the data service. The request is received at mobile AP device 150. As mobile AP device 150 is operating in the suspended data service mode, requests from mobile device 122 are processed in accordance with the one or more rules stored in memory (step 904 of FIG. 9(*a*)). In this case, the one or more rules include a rule for allowing ("whitelisting") requests to the link or URL for restoring data service. Thus, in response to receiving the request in step 902, mobile AP device 150 allows the request to be sent to mobile network 104 (step 906 of FIG. 9(*a*)). Here, mobile AP device 150 may perform one or more address translation functions for translating network and/or port addresses of the request. For example, mobile AP device 150 may perform a NAT and/or PAT on the request before communicating the request to the mobile network 104.

The request is communicated to gateway 108 of mobile network 104 (step 908 of FIG. 9(*a*)). Note that gateway 108 is also configured to process the request of mobile AP device 150 in accordance with a set of rules from the rules DB 112 (step 910 of FIG. 9(*a*)). Here, the set of rules may similarly include a rule for allowing ("whitelisting") requests to the link or URL for restoring data service. As is apparent, even when the data service of mobile AP device 150 is suspended, gateway 108 allows the request to be communicated to IP network 110 to reach server 176 (step 912 of FIG. 9(*a*)).

Server 176 processes the request to generate a response. The response is sent by server 176 to gateway 108 for further communication through mobile network 104. Mobile network 104 communicates the response to mobile AP device 150, which properly directs and communicates the response to mobile device 122. Mobile device 122 receives and process the response. For an HTTP GET request for a web page of server 176 for restoring data service, mobile device 122 receives and processes an HTTP response from server 176. The HTTP response may include web page data for visual display in the web browser application of the mobile device 122. The web page for restoring data service may include information for restoring the data service, and/or input fields for user entry of information for restoring the data service (e.g. payment information for payment of the data service or additional data, information for authentication or verification, answers to questions, etc.).

Referring now to FIG. 9(b), service monitor 190 (e.g. the OCS) is configured to monitor the service and usage (e.g. data traffic usage) of mobile devices, including mobile AP device 150. The service monitor 190 may identify a condition for restoring data service for mobile AP device 150 (step 914 of FIG. 9(b)). A condition for restoring the data service may include identifying that appropriate steps have been taken by the user of mobile device 122 and/or mobile AP device 150 to restore the data service (e.g. payment for the data service has been made, additional data has been purchased, information for authentication or verification has been made, etc.). See e.g. the description in relation to steps 902-912 of FIG. 9(a) above.

In response to identifying the condition, service monitor 190 may send a message to control center 180 (step 916 of FIG. 9(b)). Control center 180 receives this message. The message may indicate or instruct a change in data traffic handling for mobile AP device 150. In addition, or alternatively, the message may indicate or instruct a restoration in data service for mobile AP device 150. Such a message may be communicated by making an API call to the control center 180 to control or redirect subscriber data flow.

In response to receiving the message in step 916, control center 180 may send a message to policy function 192 (e.g. the PCRF) to change or update the status or set of rules for mobile AP device 150 (step 918 of FIG. 9(b)). In response, policy function 192 may send or communicate to gateway 108 an indication or name of the updated set of rules in rules DB 112 to be applied (i.e. change in the "rulebase" name) (step 920 of FIG. 9(b)). In particular, the set of rules associated with mobile AP device 150 may be updated to remove the redirection of subscriber data flow for mobile AP device 150 (e.g. "normal" processing). Gateway 108 is configured to use the updated set of rules from the rules DB 112 to process future requests from mobile AP device 150 for the restored, normal data service.

Step 920 above is performed when there is an active packet data session between mobile AP device 150 and gateway 108. More particularly, in the 3GPP Gx interface standard, the message sent from policy function 102 (i.e. the PCRF) to gateway 108 (i.e. the PGW) is referred to as a Re-Auth-Request (RAR). On the other hand, when there is no active packet data session between mobile AP device 150 and gateway 108, policy function 192 stores the indication or name in its own database and sends it to gateway 108 when the data packet session is started. More particularly, in the 3GPP Gx interface standard, gateway 108 receives the rulebase name in a Credit-Control-Answer (CCA) in response to sending policy function 192 a Credit-Control-Request (CCR) query.

Further in response to receiving the message in step 916, control center 180 may send a message to server 176 for further control of the data traffic associated with mobile AP device 150 (step 922 of FIG. 9(b)). Server 176, which may be referred to as the traffic control server, may receive this message. The message may indicate a need to change data traffic handling for mobile AP device 150. In addition, or alternatively, the message may indicate or instruct a restoration of the data service for mobile AP device 150.

In some implementations, server 176 may be owned, operated, and/or controlled by a manufacturer (i.e. the Original Equipment Manufacturer or OEM) of equipment within which mobile AP device 150 is integrated. In one example, server 174 may be owned, operated, and controlled by the OEM of a vehicle or a "connected car" within which mobile AP device 150 is integrated (see e.g. connected car 1020 of FIG. 10). Here, server 176 may be connected in a private network of the OEM. Alternatively, server 176 may be owned, operated, and/or controlled a mobile operator of mobile network 104 or a third party.

In response to receiving the message in step 922, server 176 sends one or more messages to mobile AP device 150. The one or more messages from server 176 are sent through gateway 108 (step 924 of FIG. 9(b)) to mobile network 104 (step 926 of FIG. 9(b)) for transmission to mobile AP 150 (step 928 of FIG. 9(b)). The one or more messages may instruct the mobile AP device 150 to change data traffic handling. In addition, or alternatively, the message may indicate or instruct a restoration of data service for mobile AP device 150. Also in addition, or alternatively, the message may be a message to remove the redirection of data flow.

In particular, the one or more messages may instruct mobile AP device 150 to cease processing of the one or more requests from mobile device 122 in accordance with one or more rules. The one or more messages sent in step 922 may simply instruct mobile AP device 150 to disable or deactivate the one or more rules stored in memory. Thus, future data requests from mobile device 122 will generally be allowed to be sent by mobile AP device 150 to mobile network 104 for communication to IP network 110.

Referring now to FIG. 9(c), while operating in the available data service mode of operation, mobile AP device 150 generally allows requests from mobile device 122 to be sent to mobile network 104 for the communication to IP network 110. The communication of data traffic may generally be the same as or similar to that described previously in relation to FIG. 2. Therefore, reference is made to the description of FIG. 2 to avoid unnecessary repetition.

Figure 10:
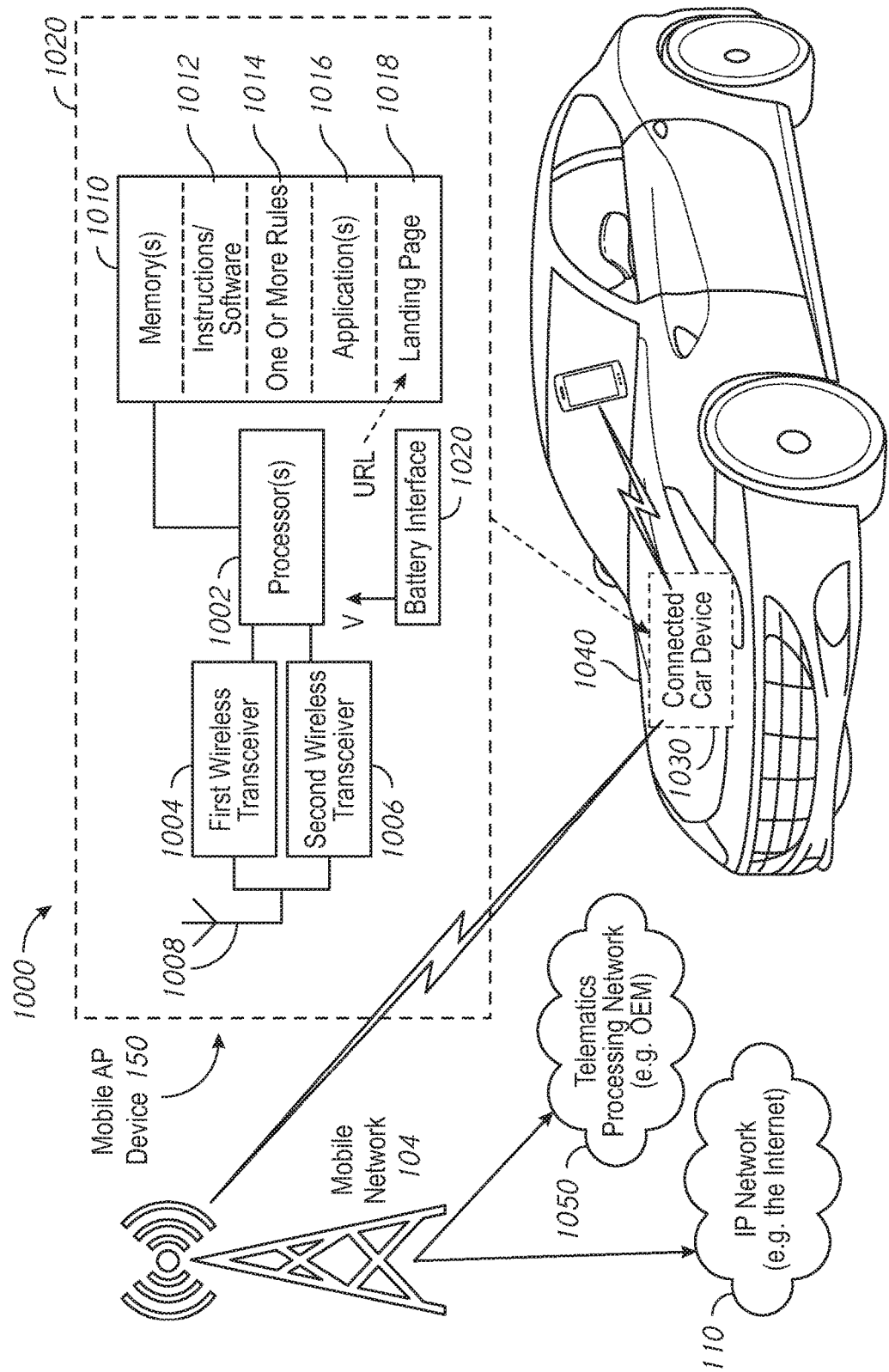
FIG. 10 is a schematic block diagram of a mobile communication device configured to operate as a mobile access point (AP) ("mobile AP device"), which may be part of a connected car module or other Internet of Things (IoT) equipment.

FIG. 10 shows a schematic diagram 1000 of an embodiment of the mobile AP device 150 of FIG. 1. In FIG. 10, mobile AP device 150 is shown in context within an illustrative system environment, namely, a "connected car" environment.

A connected car 1040 may have a connected car module 1030 which includes mobile AP device 150 in order to provide a mobile hotspot in the vehicle. Connected car module 1030 may be a vehicle control module, which has connected car functionality. Using the connected car module 1030, communication devices may access voice and/or data communication services and the IP network 110 (e.g. the Internet). Connected car module 1030 may also provide for telematics processing and communication with a telematics processing network 1050 (e.g. of or associated with the OEM) via mobile network 104.

Viewing the schematic diagram 100 of FIG. 10, mobile AP device 150 is shown to have components which may include one or more processors 1002, a first wireless transceiver 1004, a second wireless transceiver 1006, one or more antennas 1008, a memory 1010, and a battery interface 1020. Battery interface 1020 may be configured to connect to one or more batteries to provide a regulated voltage (V) and electrical power to the components. The components of mobile AP device 150 may be provided together as a single unit and, for example, contained in a mechanical housing 1020.

The one or more processors 1002 may be coupled to first and second wireless transceivers 1002 and 1004 and to memory 1010. Memory may 1010 store instructions 1012 for operation, as well as one or more applications 1016. The one or more processors 1002 are configured to operate according to the instructions 1010 to perform basic operations, as well as to perform techniques of the present disclosure.

First and second wireless transceivers 1004 and 1006 are coupled to the one or more antennas 1008 for wireless communications. One or more processors 1002 are configured to operate first wireless transceiver 1004 to provide wireless communications in accordance with a first communication protocol or standard, and configured to operate second wireless transceiver 1006 to provide wireless communications in accordance with a second communication protocol or standard.

The first communication protocol may be a Wi-Fi or WLAN protocol, which may be described in a group of specifications developed by the Institute of Electrical and Electronics Engineers (IEEE) referred to collectively as the IEEE 802.11 standard. The second communication protocol may be any suitable cellular telecommunications protocol or standard described in one of several various specifications. Thus, in some implementations, mobile AP device 150 is configured to provide a first wireless connection to a mobile device and a second wireless connection to a mobile network, where the first wireless connection is a WLAN connection and the second wireless connection is a cellular network connection.

Memory 1010 may also store one or more rules 1014, described earlier above in relation to FIGS. 3-9. In some implementations, the one or more rules 1014 may be received from control center 190 or server 176 in one or more messages via mobile network for storage in memory 1010 (see e.g. the description in relation to FIGS. 3-5 and 7-8).

Memory 1010 may also store web page data for a landing page 1018, described earlier above in relation to FIGS. 6-9. The landing page may be for visually display in a web browser application of a mobile device. The landing page may indicate that data service is suspended, and/or specify a manner by which to restore data service (e.g. providing a telephone number to call for restoring service, a link or URL to a web page for restoring service, or both).

Figure 11:
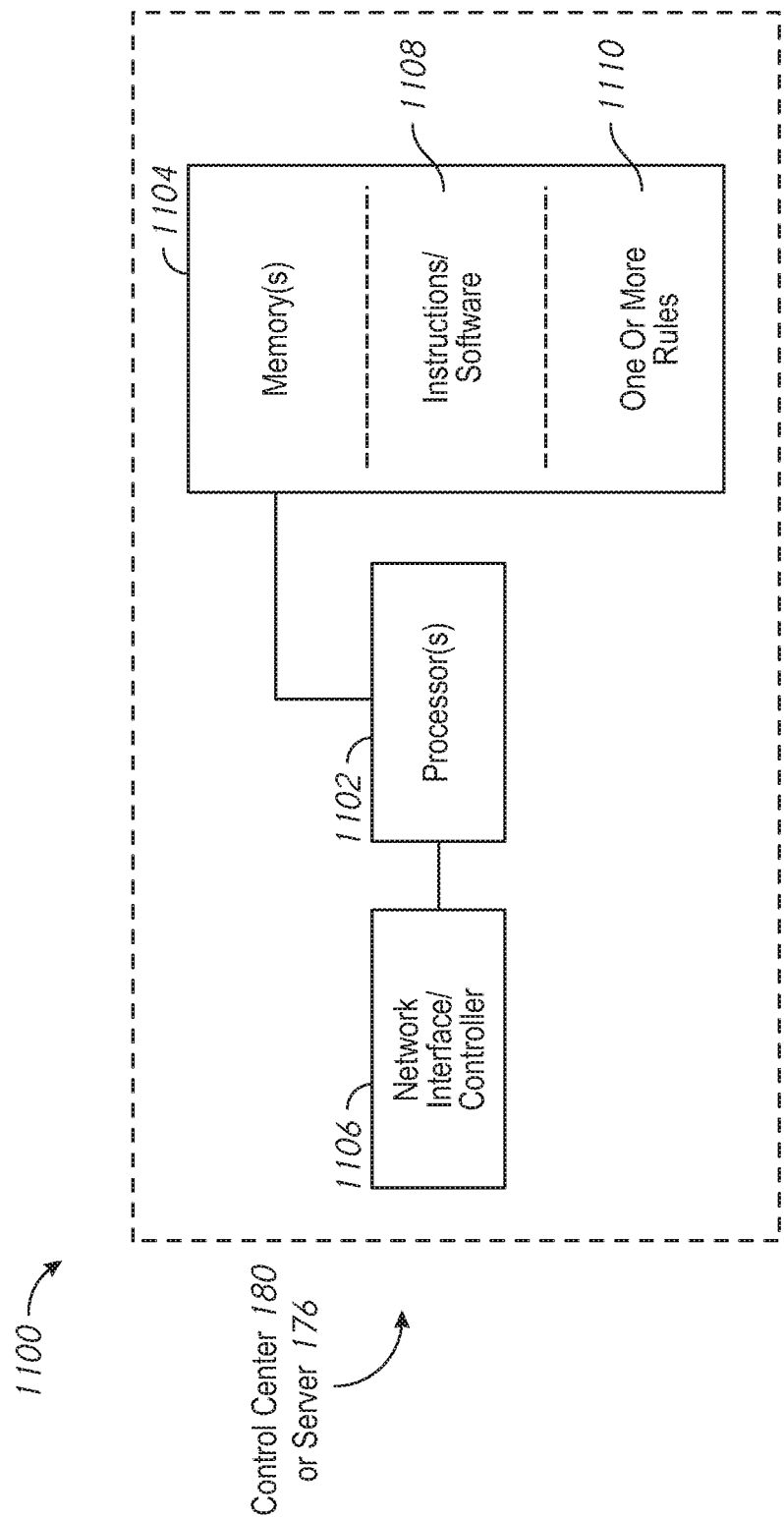
FIG. 11 is a block diagram illustrating pertinent components of a control center or server.

FIG. 11 shows a block diagram 1100 of basic pertinent components of a control center (e.g. control center 180 of FIG. 1) or a server (e.g. server 176 of FIG. 1). Note that, although different by name, control center 180 may simply be or include a server in some implementations.

Control center 180 or server 176 of FIG. 11 has components which may include one or more processors 1102 which are coupled to memory 1104 and to a network interface/controller 1106. Network interface/controller 1106 is configured to connect to a communication network for communications in an IP network, such as IP network 110 of FIG. 1. The one or more processors 1102 of control center 180 or server 176 are configured to operate according to instructions 1108 stored in memory 1104, in order to perform basic operations as well as to perform techniques of the present disclosure. Memory 1104 may also store one or more rules 1110, described earlier above in relation to FIGS. 3-9. The one or more rules 1110 may be sent by control center 180 or server 176 in one or more messages to a mobile AP device via a mobile network for storage in memory of the mobile AP device (see e.g. the description in relation to FIGS. 3-5 and 7-8).

In some embodiments, a plurality of different sets of rules may be applied for handling communications for a mobile device. For instance, there may be two, three, or four different sets of rules for different modes of operation. For example, a first set of rules may be applied for normal mode of operation and a second set of rules may be applied for data service suspended mode of operation, as described above. As another example, a first set of rules may be applied for data service suspended mode of operation, as described above, and a second set of (more stringent) rules may be applied for a cyberattack protection mode of operation (e.g. based on detection of a suspected cyberattack or DDoS attack).

Thus, as described herein, a mobile communication device may be configured to operate as a mobile access point (AP) and be referred to as a "mobile AP device" or the like. In one illustrative example, the mobile AP device receives from a mobile device one or more requests to a server or device in an IP network. When data service is available, the mobile AP device allows the one or more requests to be sent to a mobile network for communication to the server or device in the IP network. When the data service is suspended, the mobile AP device disallows the one or more requests from being sent to the mobile network to prohibit the communication to the server or device in the IP network. The data service may be part of a cellular communication service provided by a service provider, where the cellular service is made available or suspended by the service provider. The specific handling of a request may vary depending on one or more parameters of the request, such as the type of request. For an HTTP GET request, for example, the mobile AP device may additionally generate and send to the mobile device an HTTP response indicating a redirect to a local landing page of the mobile AP device.

Prior to such processing, the mobile AP device may receive via the mobile network one or more messages which instruct a change in data traffic handling. In particular, the one or more messages may instruct the mobile AP device to process the one or more requests in accordance with one or more rules for a suspended data service mode of operation. The one or more rules include a rule for disallowing the one or more requests from being sent to the mobile network during the suspended data service mode. In some implementations, the one or more messages may enable or activate one or more rules previously stored in memory of the mobile AP device. In addition, or alternatively, the one or more rules for processing the one or more requests may be received by the mobile AP device in the one or more messages and stored in memory of the mobile AP device.

Also as described herein, a control center or server may receive a message indicating a need to change data traffic handling for a mobile AP device based on one or more suspension conditions being identified. In response, the control center or server may send to the mobile AP device one or more messages which instruct a change in data traffic handling for the mobile AP device. In particular, the one or more messages may instruct the mobile AP device to process the one or more requests in accordance with one or more rules for a suspended data service mode of operation. The one or more rules include a rule for disallowing the one or more requests from being sent to the mobile network in the suspended data service mode. In some implementations, the one or more messages may enable or activate one or more rules previously stored in memory of the mobile AP device. In addition, or alternatively, the one or more rules for processing the one or more requests may be sent in the one or more messages for storage in memory of the mobile AP device.

Note that, throughout the description, use of the terminology "available data service mode" may be replaced using the terminology "allowed data service mode" or "allowed state," and use of the terminology "suspended data service mode" may be replaced using the terminology "redirected data service mode" or "redirected state."

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a mobile communication device configured to operate as a mobile access point (AP),
   receiving from a mobile device one or more requests to a server or device in an IP network;
   when cellular data service is made available by a cellular service provider, allowing the one or more requests to be sent to a mobile network for communication to the server or device in the IP network; and
   when the cellular data service is suspended by the cellular service provider, disallowing the one or more requests from being sent to the mobile network to prohibit the communication to the server or device in the IP network.

2. The method of claim 1, wherein the one or more requests comprises an HTTP or HTTPS request.

3. The method of claim 1, wherein the one or more requests comprises a request for content, the method comprising:
   at the mobile AP device,
   when the cellular data service is suspended by the cellular service provider, generating and sending to the mobile device a response indicating a redirect to a landing page, the local landing page indicating that the data service is suspended.

4. The method of claim 1, wherein one or more additional requests from the mobile device comprise a Domain Name Service (DNS) request to the IP network, the method comprising:
   at the mobile AP device,
   when the cellular data service is suspended by the cellular service provider, allowing the DNS request to be sent to the mobile network for communication to the IP network.

5. The method of claim 1, wherein the one or more requests comprises an HTTP GET request, the method comprising:
   at the mobile AP device,
   when the cellular data service is suspended by the cellular service provider, generating and sending to the mobile device an HTTP response indicating a redirect to a local landing page stored in the mobile AP device, the local landing page indicating a telephone number or a link for restoring the data service.

6. The method of claim 5, wherein one or more additional requests from the mobile device comprise an HTTP request to the link for restoring the data service, the method comprising:
   at the mobile AP device,
   when the cellular data service is suspended by the cellular service provider, allowing the HTTP request to the link for restoring the data service to be sent to the mobile network for communication to the IP network.

7. The method of claim 1, comprising:
   at the mobile AP device,
   receiving via the mobile network a message which instructs a change in data traffic handling; and
   in response to receiving the one or more messages, processing the one or more requests in accordance with one or more rules while the cellular data service is suspended by the cellular service provider, for disallowing the one or more requests from being sent to the mobile network to prohibit the communication to the server or device in the IP network.

8. The method of claim 1, comprising:
   at the mobile AP device,
   receiving over the mobile network one or more messages which include one or more rules for processing the one or more requests; and
   processing the one or more requests in accordance with the one or more rules while the cellular data service is suspended by the cellular service provider, for disallowing the one or more requests from being sent to the mobile network to prohibit the communication to the server or device in the IP network.

9. The method of claim 1, wherein the mobile AP device is configured to provide a first wireless connection to a mobile device and a second wireless connection to a mobile network, the first wireless connection comprising a wireless local area network (WLAN) connection and the second wireless connection comprising a cellular telecommunications network connection.

10. The method of claim 1, wherein the mobile AP device comprises part of a connected car module.

11. The method of claim 1, which is embodied in a computer program product comprising a non-transitory computer readable medium and instructions stored on the non-transitory computer readable medium, the instructions being executable on one or more processors of the mobile AP device for performing the steps of the method.

12. A mobile device configured to operate as a mobile access point (AP), the mobile AP device comprising:
   a first wireless transceiver;
   a second wireless transceiver;
   one or more processors coupled to the first and the second wireless transceivers;
   memory coupled to the one or more processors;
   the one or more processors configured to operate according to instructions stored in the memory for:
      receiving from a mobile device via the first wireless transceiver one or more requests to a server or device in an IP network;
      when cellular data service is made available by a cellular service provider, allowing the one or more requests to be sent to a mobile network via the second wireless transceiver for communication to the server or device in the IP network; and
      when the cellular data service is suspended by the cellular service provider, disallowing the one or more requests from being sent to the mobile network via the second wireless transceiver to prohibit the communication to the server or device in IP network.

13. The mobile AP device of claim 12, wherein the first wireless transceiver comprises a wireless local area network (WLAN) transceiver, the second wireless transceiver comprises a cellular transceiver, the data service comprises a cellular data service of the mobile AP device, and the one or more requests comprises a request for content.

14. The mobile AP device of claim 12, wherein the one or more requests comprises a request for content, the one or more processors configured to operate according to the instructions for:
   when the cellular data service is suspended by the cellular service provider, generating and sending to the mobile device a response indicating a redirect to a landing page, the landing page indicating that the data service is suspended.

15. The mobile AP device of claim 12, wherein the one or more requests comprises an HTTP GET request, the one or more processors configured to operate according to the instructions for:
   when the cellular data service is suspended by the cellular service provider,
      generating and sending to the mobile device an HTTP response indicating a redirect to a local landing page stored in the mobile AP device, the local landing page indicating a telephone number or a link for restoring the data service; and
      allowing an HTTP GET request to the link for restoring the data service to be sent via the second wireless transceiver to the mobile network for communication to the IP network.

16. The mobile AP device of claim 12, the one or more processors configured to operate according to the instructions for:
   receiving from the mobile network via the second wireless transceiver a message which instructs a change in data traffic handling; and
   in response to receiving the message, processing the one or more requests in accordance with one or more rules, for disallowing the one or more requests from being sent via the second wireless transceiver to the mobile network to prohibit the communication to the server or device in the IP network.

17. The mobile AP device of claim 12, the one or more processors configured to operate according to the instructions for:
   receiving from the mobile network via the second wireless transceiver one or more messages which instruct a change in data traffic handling, the one or more messages comprising one or more rules for processing the one or more requests; and
   processing the one or more requests in accordance with the one or more rules, for disallowing the one or more requests from being sent via the second wireless transceiver to the mobile network to prohibit the communication to the server or the device in the IP network.

18. A method comprising:
   at a control center or server configured to control data traffic for a mobile device which is operable as a mobile access point (AP), where the mobile AP device is configured to connect a mobile device to an IP network via a mobile network and allow one or more requests from the mobile device to be sent to the mobile network for communication to a server or device in the IP network while cellular data service for the mobile AP device is made available by a cellular network provider,
      receiving a message which instructs a change in data traffic handling for the mobile AP device; and
      in response to receiving the message, sending to the mobile AP device a message which instructs the mobile AP device to process the one or more requests in accordance with one or more rules while the cellular data service is suspended by the cellular service provider for disallowing the one or more requests from being sent to the mobile network.

19. The method of claim 18, comprising:
   at the control center or server,
      sending to the mobile AP device the one or more rules for processing the one or more requests.

20. The method of claim 18, further comprising:
   wherein sending the one or more messages comprises sending the one or more rules for processing the one or more requests in the one or more messages;
   wherein receiving the message which instructs the change in data traffic handling comprises receiving the message from an online charging system (OCS);
   wherein one of the one or more rules comprises a rule to disallow an identified HTTP or HTTPS request from being sent to the mobile network; or
   wherein one of the one or more rules comprises a rule to disallow an identified HTTP GET request from being sent to the mobile network to prohibit its communication to the server or device in IP network, and to generate and send to the mobile device an HTTP response comprising a redirect to a local landing page stored in the mobile AP device.

* * * * *